(12) United States Patent
Jakob-Bamberg et al.

(10) Patent No.: US 7,650,726 B2
(45) Date of Patent: Jan. 26, 2010

(54) RAISED ACCESS FLOOR SYSTEM

(75) Inventors: Rupert Jakob-Bamberg, Calgary (CA); Dale Marshall, Calgary (CA); Darren Long, Calgary (CA); Jay Clintberg, Calgary (CA); Vincent Shivak, Calgary (CA); Paul Spavor, Calgary (CA)

(73) Assignee: Haworth, Ltd., Calgary, Alberta (CA)

( * ) Notice: Subject to any disclaimer, the term of this patent is extended or adjusted under 35 U.S.C. 154(b) by 405 days.

(21) Appl. No.: 11/138,735

(22) Filed: May 26, 2005

(65) Prior Publication Data
US 2005/0235589 A1    Oct. 27, 2005

Related U.S. Application Data

(62) Division of application No. 10/373,585, filed on Feb. 24, 2003, now Pat. No. 6,918,217.

(60) Provisional application No. 60/359,356, filed on Feb. 25, 2002.

(51) Int. Cl.
*E04B 5/00* (2006.01)
*E04C 2/52* (2006.01)

(52) U.S. Cl. .................. 52/263; 52/220.1; 52/126.6; 248/188.2

(58) Field of Classification Search .................. 52/263, 52/220.1, 220.2, 220.5, 126.5, 126.6; 248/188.1, 248/188.2, 354.1; 174/482, 484, 486, 490, 174/503
See application file for complete search history.

(56) References Cited

U.S. PATENT DOCUMENTS

| | | | |
|---|---|---|---|
| 1,915,896 A | | 6/1933 | Maul |
| 2,797,448 A | | 7/1957 | Revell et al. |
| 3,173,227 A | * | 3/1965 | Clark ..................... 285/149.1 |
| 3,318,057 A | | 5/1967 | Norsworthy |
| 3,396,501 A | * | 8/1968 | Tate ............................. 52/263 |
| 3,435,568 A | * | 4/1969 | Hoseason et al. .......... 52/220.5 |
| 3,606,704 A | * | 9/1971 | Denton ...................... 52/167.8 |
| 3,616,584 A | * | 11/1971 | Sartori ....................... 52/126.6 |
| 3,811,237 A | * | 5/1974 | Bettinger ................... 52/126.6 |
| 3,872,234 A | * | 3/1975 | Smith .......................... 174/38 |
| 3,967,426 A | | 7/1976 | Ault et al. |
| 4,067,156 A | | 1/1978 | Downing, Jr. |
| 4,143,845 A | | 3/1979 | Harris |
| 4,558,544 A | * | 12/1985 | Albrecht et al. ............ 52/126.6 |

(Continued)

FOREIGN PATENT DOCUMENTS

GB    2175936 A    12/1986

*Primary Examiner*—Robert J Canfield
*Assistant Examiner*—Brent W Herring
(74) *Attorney, Agent, or Firm*—Flynn, Thiel, Boutell & Tanis, P.C.

(57) ABSTRACT

A floor panel for a raised access floor system, including a shallow metal pan with a bottom wall and a shallow upwardly-opening compartment. The bottom wall has a plurality of first hollow projections projecting upwardly therefrom, which projections adjacent upper ends thereof having sidewardly projecting rib structure. The bottom wall also has a plurality of microfeatures which project upwardly through a lesser extent. The number of microfeatures is substantially greater than the number of projections. The pan side walls and bottom wall are free of openings therethrough. A mass of solidified concrete fills the compartment. The floor panel is supported on a pedestal having a base which has clamping and mounting features integrated thereon for engaging grounding wires and cable management members.

26 Claims, 18 Drawing Sheets

U.S. PATENT DOCUMENTS

| | | | |
|---|---|---|---|
| 4,606,156 A | 8/1986 | Sweers et al. | |
| 4,612,746 A * | 9/1986 | Higgins | 52/220.5 |
| 4,621,468 A | 11/1986 | Likozar | |
| 4,623,204 A * | 11/1986 | Auclair | 439/100 |
| 4,637,181 A * | 1/1987 | Cohen | 52/126.5 |
| 4,639,204 A | 1/1987 | Munsey et al. | |
| 4,640,073 A | 2/1987 | Blecher | |
| 4,719,727 A | 1/1988 | Cooper et al. | |
| 4,729,859 A | 3/1988 | Munsey et al. | |
| 4,736,555 A * | 4/1988 | Nagare et al. | 52/126.6 |
| 4,823,752 A * | 4/1989 | Uuskallio | 123/400 |
| 4,833,845 A | 5/1989 | Brueckner et al. | |
| 4,922,670 A * | 5/1990 | Naka et al. | 52/126.6 |
| 4,982,539 A * | 1/1991 | Hiller | 52/263 |
| 4,996,804 A * | 3/1991 | Naka et al. | 52/126.6 |
| 5,031,368 A | 7/1991 | Matthews | |
| 5,048,242 A | 9/1991 | Cline | |
| 5,049,700 A | 9/1991 | Kobayashi et al. | |
| 5,057,355 A | 10/1991 | Klingelhofer et al. | |
| 5,111,630 A | 5/1992 | Munsey et al. | |
| 5,187,907 A | 2/1993 | Takeda et al. | |
| 5,333,423 A * | 8/1994 | Propst | 52/126.6 |
| 5,398,466 A | 3/1995 | Oyama et al. | |
| 5,411,228 A * | 5/1995 | Morawa et al. | 248/74.5 |
| 5,477,649 A | 12/1995 | Bessert | |
| 5,531,410 A | 7/1996 | Simon | |
| 5,548,932 A | 8/1996 | Mead | |
| 5,628,157 A * | 5/1997 | Chen | 52/263 |
| 5,673,522 A | 10/1997 | Schilham | |
| 5,791,096 A * | 8/1998 | Chen | 52/126.6 |
| D398,218 S * | 9/1998 | Coll et al. | D8/356 |
| 5,949,020 A * | 9/1999 | Mitchell et al. | 174/40 CC |
| 5,953,870 A | 9/1999 | Jette | |
| 6,019,323 A | 2/2000 | Jette | |
| 6,061,884 A | 5/2000 | Ohms et al. | |
| 6,061,982 A | 5/2000 | Owen | |
| 6,427,400 B1 * | 8/2002 | Greenblatt | 52/220.5 |
| 6,449,912 B2 | 9/2002 | Jette | |
| 6,463,704 B1 | 10/2002 | Jette | |
| 6,508,037 B1 | 1/2003 | Owen | |
| 6,637,161 B1 * | 10/2003 | Buchalter et al. | 52/126.6 |
| 6,637,165 B2 | 10/2003 | Jette | |
| 6,669,163 B2 * | 12/2003 | Davis, Jr. | 248/346.01 |
| 6,672,022 B2 * | 1/2004 | Simmons | 52/263 |
| 6,715,719 B2 * | 4/2004 | Nault et al. | 248/68.1 |
| 6,772,564 B2 * | 8/2004 | Leon | 52/126.5 |
| 7,140,156 B1 * | 11/2006 | Lowe et al. | 52/263 |
| 7,373,759 B1 * | 5/2008 | Simmons | 52/220.5 |
| 2002/0109055 A1 * | 8/2002 | Davis, Jr. | 248/188.5 |
| 2002/0116880 A1 | 8/2002 | Greenblatt | |
| 2002/0184843 A1 * | 12/2002 | Jette | 52/220.1 |
| 2002/0194801 A1 | 12/2002 | Jette | |
| 2003/0051420 A1 * | 3/2003 | Leon | 52/126.6 |
| 2003/0089049 A1 * | 5/2003 | Scissom et al. | 52/126.1 |
| 2003/0097806 A1 * | 5/2003 | Brown | 52/220.1 |
| 2003/0213191 A1 * | 11/2003 | Jette | 52/220.1 |
| 2005/0166483 A1 * | 8/2005 | Mead | 52/126.7 |
| 2006/0248814 A1 * | 11/2006 | Chen et al. | 52/126.6 |
| 2006/0289539 A1 * | 12/2006 | Maloney et al. | 220/210 |

* cited by examiner

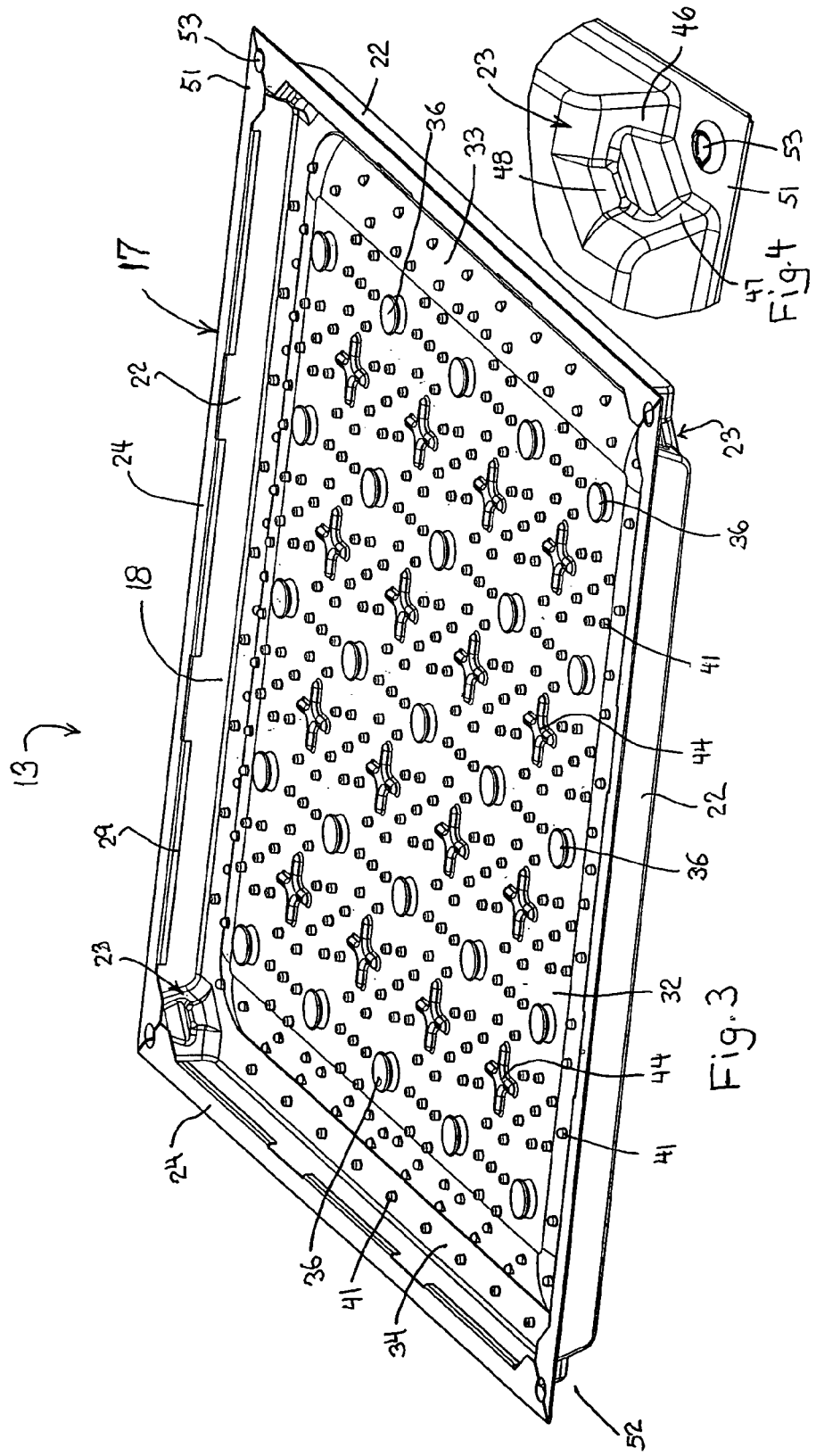

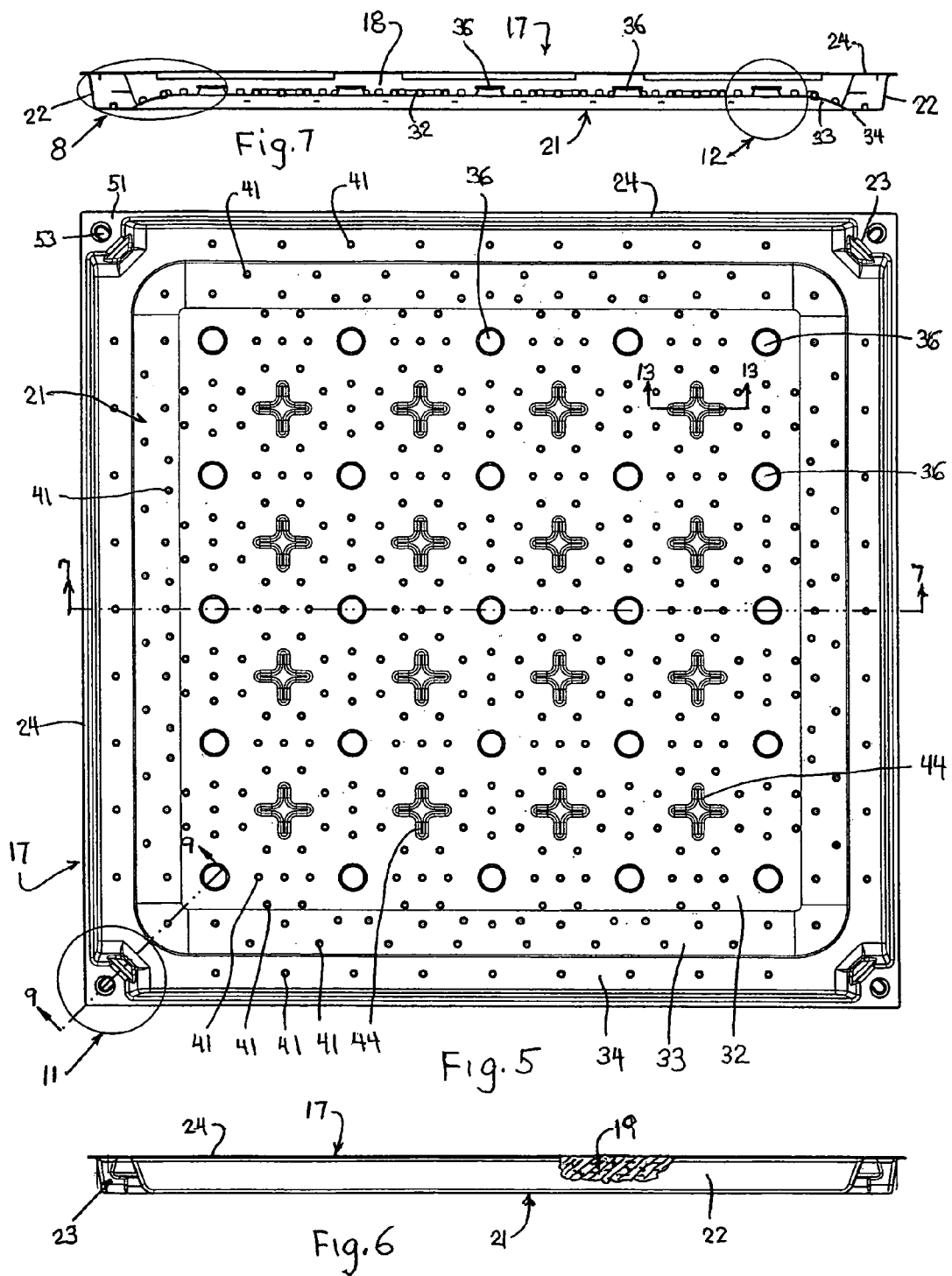

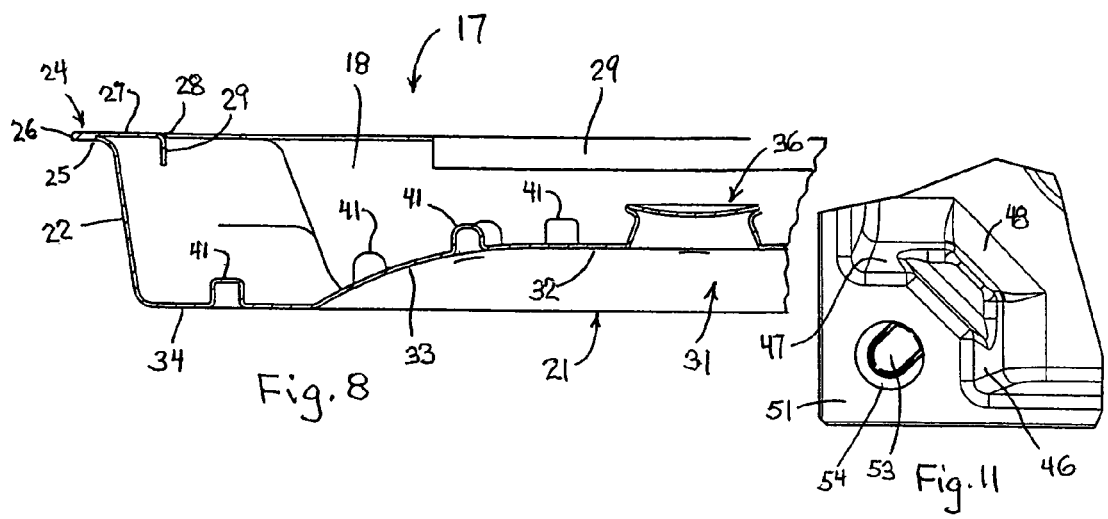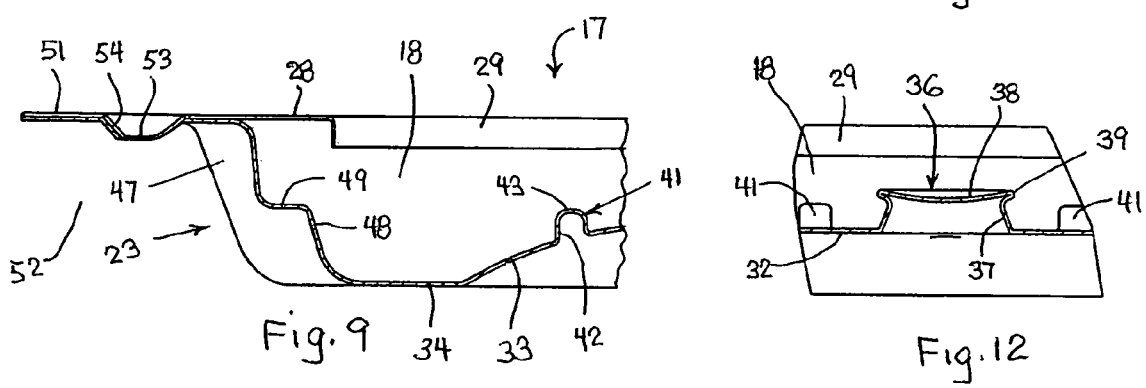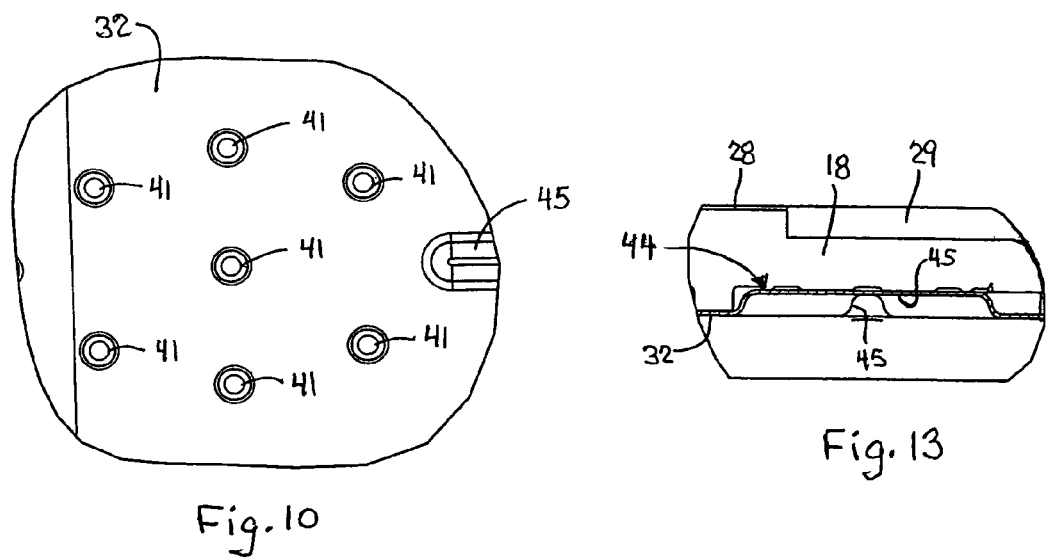

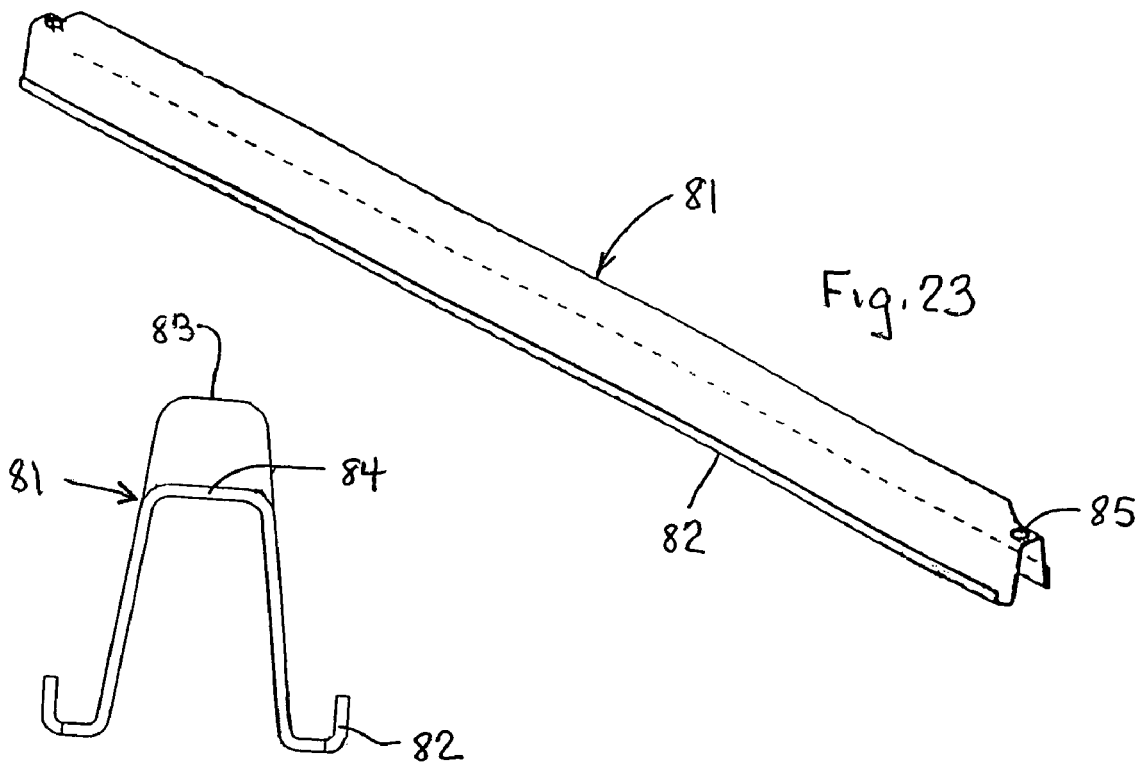

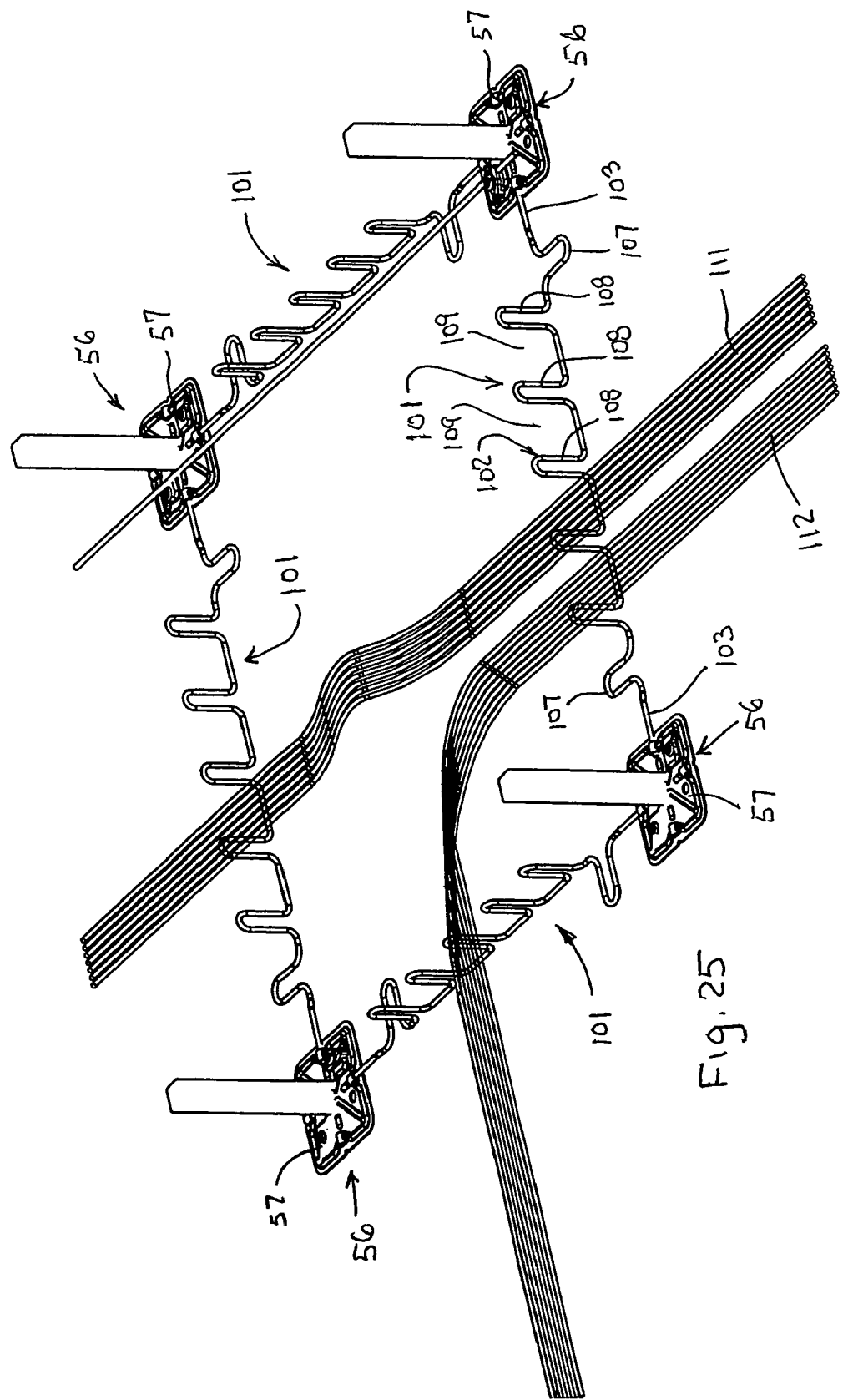

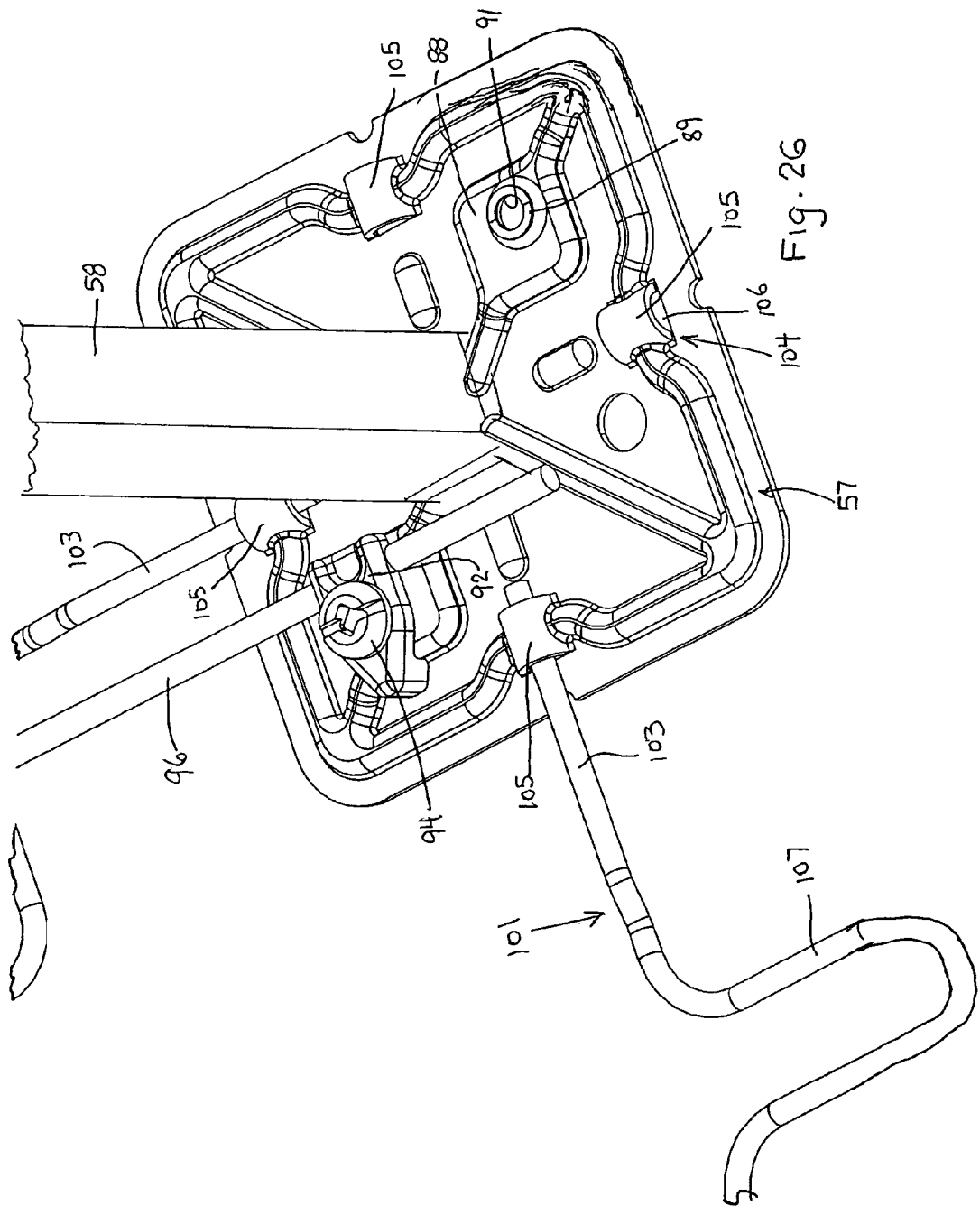

RAISED ACCESS FLOOR SYSTEM

CROSS-REFERENCE TO RELATED APPLICATION

This application is a divisional of application Ser. No. 10/373,585 filed Feb. 24, 2003, which is now U.S. Pat. No. 6,918,217 which in turn claims priority under 35 USC §119 (e) of copending provisional application Ser. No. 60/359,356 filed Feb. 25, 2002, the entire disclosures of which are herein incorporated by reference.

FIELD OF THE INVENTION

This invention relates to a raised access floor assembly and, more specifically, to a system utilizing improved steel and concrete composite floor panels.

The invention also relates to an improved raised access floor system incorporating improved pedestals for supporting the floor panels, and specifically pedestals which have improved supportive engagement with the floor panels and which additionally have integrated features for accommodating grounding wires and cable management members.

BACKGROUND OF THE INVENTION

A significant variety of raised access floor systems have been developed for use in commercial buildings. Such systems typically employ a plurality of height-adjustable pedestals which are supported on the main floor and, when disposed in a gridlike arrangement, support a plurality of removable floor panels on the upper ends thereof. The floor panels are formed using numerous construction techniques, with one common technique employing a formed sheet metal pan defining an upwardly opening compartment which is filled with concrete. The space below the raised floor is utilized for accommodating cabling (power, data and communication), and in addition accommodates or defines ducts for heating, ventilating and air conditioning (HVAC).

In known floors employing composite steel and concrete floor panels, many of the floor panels have a substantially uniform depth throughout the pan such that the quantity of concrete utilized and the resulting weight of the floor panel is heavy. These arrangements also result in the bottom of the concrete being loaded in tension when the upper surface of the floor panel is subjected to heavy loads, and since concrete does not possess good durability when loaded in tension, it has been observed that floor panels of this type undergo undesired cracking and failure.

In an effort to improve the strength of the concrete as formed in the metal pan, numerous pans have been developed which provide some type of upward projection associated with the bottom wall so as to hopefully improve the mechanical securement and strength properties between the concrete and the steel pan. These projections often are lanced upwardly from the bottom wall of the pan, thereby leaving openings in the bottom of the pan whereby filling of the pan with wet concrete creates leakage or seal problems which hence complicate the overall manufacturing process.

With known floor systems, and specifically installation thereof, numerous cables (power, data and communication) are typically installed into the open space below the floor system, and these cables generally are positioned somewhat randomly within this space. The overall largeness of this open space makes organization and identification of the various cables difficult. In an attempt to at least partially alleviate this problem, other manufacturers have provided special devices which are positioned in the space below the raised floor so as to occupy at least some of the space which exists between the pedestals. While these devices, which typically are formed as large upwardly opening trays or the like, have been at least partially effective with respect to being able to organize and identify the plurality of cables, nevertheless the devices are for the most part bulky and must be purchased from a separate supplier and effectively interfitted into the space below the raised floor, such that the overall purchase and installation of the raised floor becomes more complex and expensive.

Installation of conventional raised floors also typically requires that the numerous pedestals associated with the floor, because of the significant metal content associated with the floor panels, be electrically grounded. This is typically done by electricians after the floor has been installed, and involves positioning grounding wires throughout the space and then adapting clamps to the pedestals for securement of the grounding wires thereto. This is a time consuming and adaptive effort since the electrician must identify and provide clamps which can be suitably secured to the pedestal.

In addition, these devices typically require some type of special clip or fixture for permitting securement of the device either to the pedestals or to the floor panel supporting runners which extend between adjacent pedestals. This hence increases the overall structural complexity and cost of such devices, and in particular makes installation of such devices more difficult and time-consuming. Further, some of these devices require that special runners be provided for supporting the floor panel in order to also accommodate the cable support device, and this hence significantly increases the overall complexity and cost of the system.

It is an object of this invention to provide an improved raised access floor system, including improvements associated with both the floor panels and the pedestals used for supporting the floor panels, which improvements are believed to overcome or at least minimize many of the disadvantages associated with prior systems as briefly discussed above.

It is also an object of this invention to provide an improved cable management arrangement for use in association with a raised floor system, which cable management system employs a basic cable manager formed generally in one piece and having connecting parts integrally associated therewith, the latter preferably being resiliently deflectable to permit them to be easily engaged with adjacent pedestals without requiring separate mounting parts or hardware, whereby the cable management devices can be readily installed with the raised floor system in a simple and economical manner, thereby overcoming or at least minimizing many of the disadvantages associated with prior systems as discussed above.

The present invention relates to an improved steel and concrete composite floor panel intended for use in a raised floor system, wherein the floor panel is defined by a thin metal (i.e. steel) pan which defines a shallow upwardly opening compartment therein which is filled with concrete. The horizontally large bottom wall of the pan has a significantly large center portion which is deformed upwardly relative to the edge portions so that the center portion of the concrete will be of reduced thickness relative to the edge portion of the concrete, the latter cooperating with side walls on the pan and being confined between the bottom wall and the top flange so that the edges of the floor panel have a high strength beamlike structure extending therealong, whereas the reduced center thickness of the concrete permits reduction in floor panel weight while permitting more efficient utilization of the strength properties of the panel. The bottom wall also has a first plurality of projections protruding upwardly therefrom which create a mechanical interlock with the concrete. The bottom wall of the pan also has a plurality of second projections protruding upwardly therefrom into the concrete, the second projections being smaller and of significantly greater numbers than the first projections so as to provide supportive engagement with the concrete at a large number of locations so that the loading stresses imposed on the concrete, and specifically the tension stresses thereon adjacent the bottom of the concrete, are immediately transferred to the bottom wall of the steel pan at a large number of locations so as to minimize the tendency for the concrete to fail under tension.

The improved floor panel of the present invention, as aforesaid, also has a gusseted corner associated with the metal pan so as to improve the strength and rigidity thereof, with the gusseted corner defining therein a step or shoulder positioned downwardly from the upper corner of the top flange so that the corner of the pan, when seated on a pedestal head, can be at least partially supportingly engaged at the step to provide for improved supportive engagement with the pedestal.

The floor panel of the present invention, as aforesaid, preferably forms the metal pan in one piece from sheet metal, and the pan throughout the bottom and side walls is free of perforations or openings to hence create a seal for confinement of the concrete during manufacture of the floor panel.

The present invention also relates to an improved pedestal assembly and preferably a height-adjustable pedestal which, at its upper end, has an improved pedestal head which is positioned for supportive engagement of the corners of four floor pans to maintain the floor pans in the desired raised position. The pedestal head has a top wall which at the center thereof joins to an upper end of an upright pedestal stem, with the top wall having four support portions spaced around the center thereof and each having an opening therethrough for accommodating a fastener which projects downwardly from an upper corner of a respective floor panel. The pedestal head also has, adjacent the periphery thereof, four shelves formed in spaced relationship therearound adjacent the outer periphery thereof, which shelves are spaced downwardly from the top wall and project outwardly so as to project under and hence supportingly engage the steps associated with the gusseted corners of the floor panels.

The pedestal assembly of the present invention in addition includes improved connecting features integrally associated therewith, such as with the base of the pedestal, for facilitating attachment of one half of a clamp, the other half of the clamp being integrated on the base, to permit a grounding wire to be easily and efficiently coupled to the pedestal.

The improved pedestal assembly of the present invention also has connecting structure integrated with the base thereof to permit a cable manager to be readily coupled to the base to permit positional control over cables which are stored in the space below the raised floor. The cable manager according to one embodiment of the invention is formed as an elongate element which has opposite ends thereof which attach to integrated attachment structures associated with a pair of adjacent pedestal bases without requiring separate attachment parts or fixtures. The cable manager also has an elongate center portion which extends between the pedestal bases and defines therein a plurality of sidewardly adjacent, upwardly opening channels for permitting cables to be disposed therein to provide positional organization for the cables.

According to a further embodiment, the cable manager is formed as a horizontally extending tray or shelf which, at the corners along at least one edge thereof, is provided with support legs which at lower ends have end parts which attach to integrated attachment structures associated with a pair of adjacent pedestal bases without requiring separate parts or fixtures. The tray or shelf adjacent an opposite edge thereof is provided with support arms which either project generally horizontally for supportive engagement with an adjacent tray, or project downwardly for engagement with the floor, to maintain the tray in a generally horizontal orientation wherein it occupies a significant portion of the area between adjacent pedestal assemblies as associated with adjacent rows of such assemblies. The tray is maintained in downwardly spaced relation from the raised floor panels, but is spaced upwardly from the subfloor for permitting significant quantities of cables to be positionally supported thereon.

Other objects and purposes of the invention will be additionally described hereinafter, and will also be apparent to persons familiar with raised floor assemblies after reading the following specification and inspecting the accompanying drawings.

BRIEF DESCRIPTION OF THE DRAWINGS

FIG. 3 is a perspective view of an improved metal floor pan used for constructing the improved floor panel of the present invention.

FIG. 4 is a fragmentary perspective view showing one corner, in an inverted position, of the pan of FIG. 3.

FIG. 5 is a top view of the improved metal pan, prior to pouring of the concrete therein.

FIG. 6 is a side elevational view of the pan shown in FIG. 5.

FIG. 7 is a central cross-sectional view of the pan taken generally along line 7-7 in FIG. 5.

FIG. 8 is an enlarged fragmentary sectional view showing an edge portion of the pan as contained within the circle designated 8 in FIG. 7.

FIG. 9 is a fragmentary sectional view of the corner of the pan as taken generally along line 9-9 in FIG. 5.

FIG. 10 is an enlarged, fragmentary top view showing one of the clusters of micro-features which are associated with and project upwardly from the bottom wall of the pan.

FIG. 11 is an enlarged fragmentary top view showing the corner of the pan and specifically the area enclosed within the circle designated 11 in FIG. 5.

FIG. 12 is an enlarged fragmentary sectional view showing the region of the pan contained within the circle designated 12 in FIG. 7.

FIG. 13 is an enlarged fragmentary sectional view taken generally along line 13-13 in FIG. 5.

FIG. 23 is a perspective view illustrating an elongate stringer which couples adjacent pedestal heads for supportive engagement with adjacent edges of adjacent floor panels, and FIG. 24 is an enlarged end view of the stringer shown in FIG. 23.

FIG. 25 is a diagrammatic perspective view, taken from above, and illustrating wire managers and their connection between the bases of adjacent pedestals, and the manner in which the wire managers cooperate for organizing and positioning cables.

FIG. 26 is an enlarged fragmentary perspective view which illustrates the base of a pedestal and the manner in which the ground wires and wire managers couple thereto.

Figure 1:
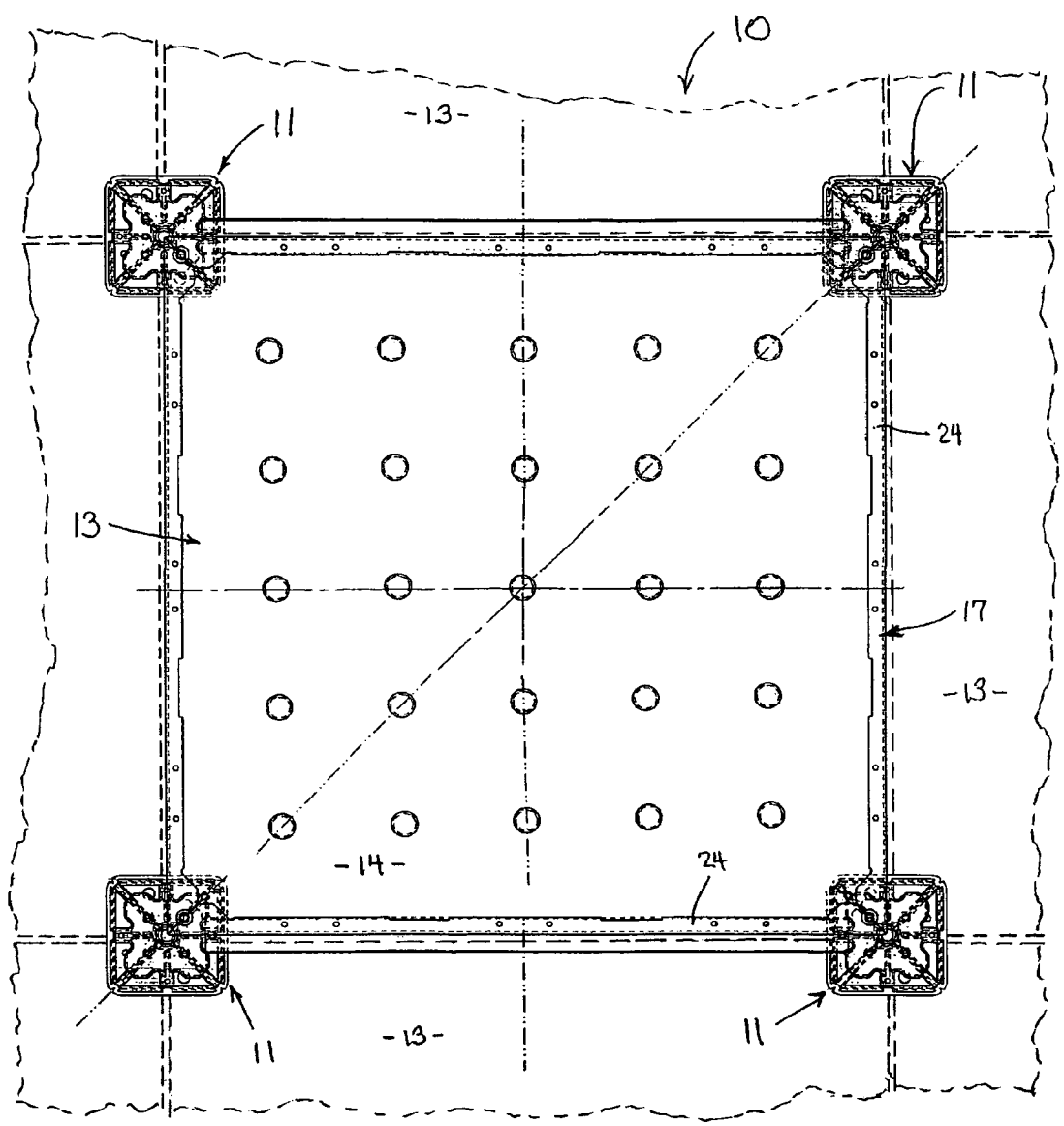
FIG. 1 is a plan view which illustrates a floor panel supported at the corners thereof by upright pedestal assemblies, with fragments of adjacent floor panels being indicated by dotted lines.

Certain terminology will be used in the following description for convenience in reference only, and will not be limiting. For example, the words "upwardly", "downwardly", "rightwardly" and "leftwardly" will refer to directions in the drawings to which reference is made. The words "upwardly" and "downwardly" will also refer to the normal positional relationship of the raised floor assembly relative to the building floor. The words "inwardly" and "outwardly" will refer to directions toward and away from, respectively, the geometric center of the arrangement or designated parts thereof. Said terminology will include the words specifically mentioned, derivatives thereof, and words of similar import.

DETAILED DESCRIPTION

Figure 2:
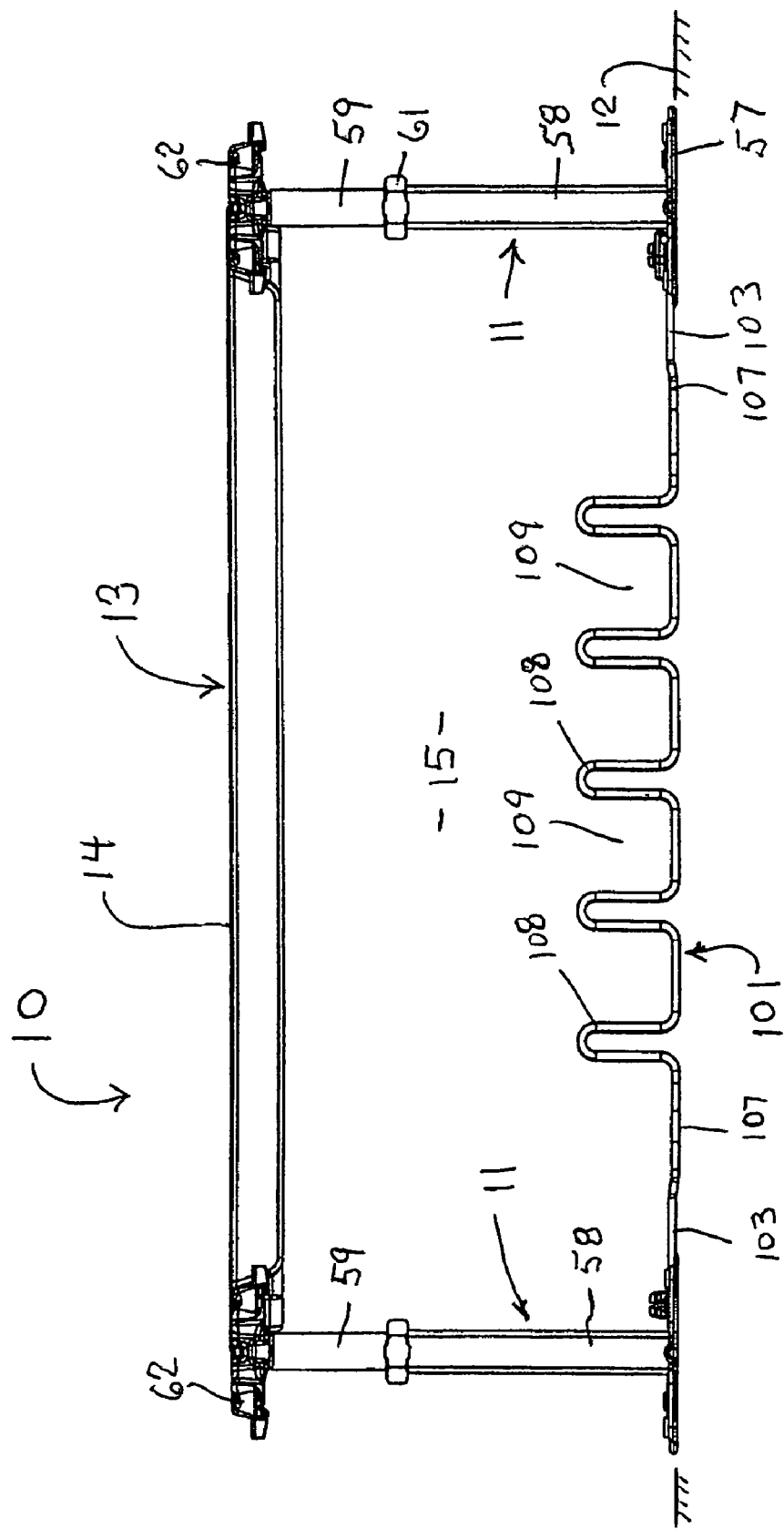
FIG. 2 is an elevational view which illustrates a plurality of pedestals supported on a floor and having a floor panel supported on the upper ends thereof.

Referring to FIGS. 1 and 2, there is illustrated a raised access floor system according to the present invention. The system 10, as is generally conventional, includes a plurality of height-adjustable upright pedestals 11 which are supported on and project upwardly from a base surface 12, such as a conventional building floor, with the pedestals being arranged in aligned transversely-extending rows and columns to define a square grid. A plurality of removable floor panels or tiles 13 are supported on the upper ends of the pedestals, which floor panels are typically square and supported on the pedestals in such a manner that each floor panel has the four corners thereof supported on a separate pedestal, with each pedestal typically in turn supporting thereon the corners of four adjacent floor panels. The upper surfaces 14 of the floor panels may directly define the floor, or alternatively the surfaces may have a suitable-floor covering such as carpet tiles disposed thereover. The raised disposition of the floor panels 13 relative to the building floor 12 defines a significant clearance space 15 therebetween which is conventionally utilized to accommodate large numbers of cables, such as power, data and/or communication cables, and this space also is used to accommodate or define ducts for the HVAC system.

Figure 33:
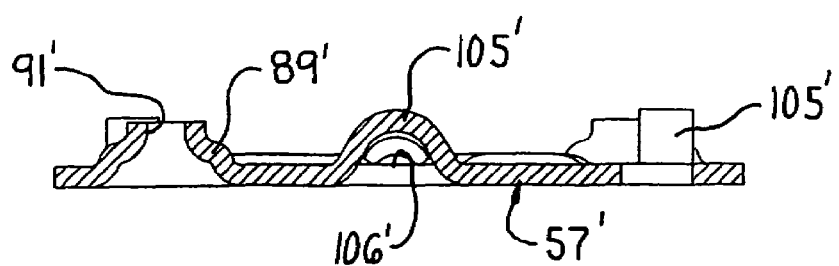
FIG. 33 is a cross-sectional view taken generally along line 33-33 in FIG. 32.
Figure 34:
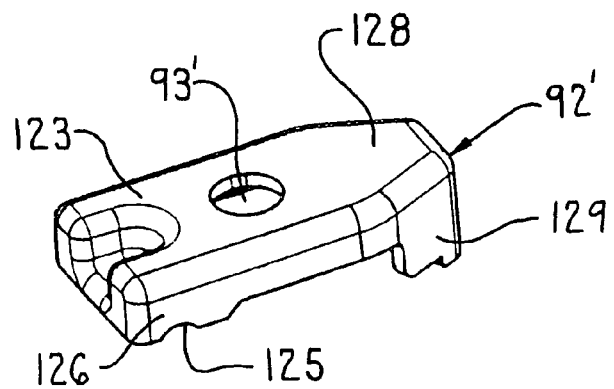
FIG. 34 is a perspective view, taken generally from above, and showing solely the ground clamp member which is provided for cooperation with the base of FIGS. 30-33.
Figure 35:
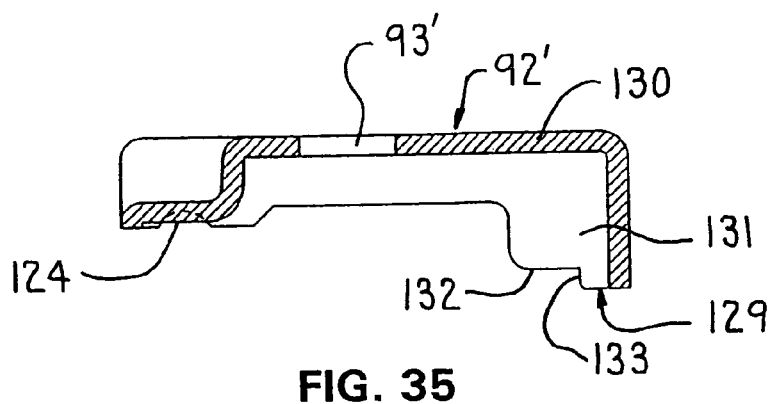
FIG. 35 is a cross-sectional view taken centrally along the lengthwise extent of the clamp member shown in FIG. 34.
Figure 36:
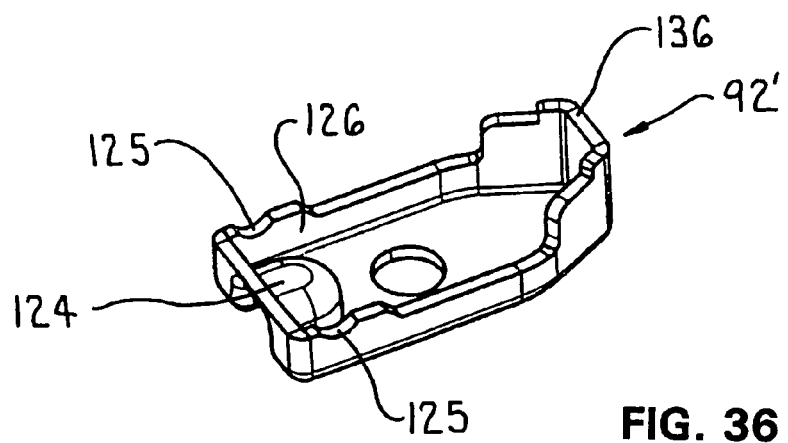
FIG. 36 is a perspective view which illustrates the underside of the clamp member shown in FIG. 34.

The system 10 of the present invention also provides an improved wire manager which connects between the bases of adjacent pedestals and which is positioned to effectively overlie the support surface or floor 13. One embodiment of a wire manager 101 is shown in FIG. 2, and another embodiment of a wire manager 141 is shown in FIG. 33. The construction and function of the wire managers 101 and 141 are described hereinafter.

The construction of the floor panel 13 according to the present invention will now be described in detail with reference to FIGS. 3-13.

The floor panel 13 is a steel/concrete composite defined by a shallow metal pan 17 defining therein a shallow upwardly-opening compartment 18 which is filled with a material which can be flowed into and then rigidified within the compartment, preferably concrete of a suitable formulation so as to facilitate handling during manufacture of the floor pan, while at the same time permitting a fast curing of the concrete within the pan while resulting in a lightweight and strong finished structure. The pan 17 is preferably formed from sheet steel, preferably galvanized steel to eliminate the need for any secondary protective coating, and the sheet steel is suitably cold worked so as to deform the sheet steel so that the entire shallow pan is a one-piece monolithic construction having side and bottom walls which are free of openings or perforations therethrough, as explained hereinafter.

The shallow pan 17 includes a horizontally large bottom wall 21 which, along the edges thereof, is integrally joined through rounded corners to upwardly projecting side walls 22, the latter being of small height relative to the dimensions of the bottom wall. The side walls 22 (FIG. 13) are all provided with a slight outward divergence or taper as they project upwardly. The corners of the pan, where the side walls and bottom wall meet, are defined by a gusseted corner structure 23 which is deformed inwardly relative to both the bottom wall and the side walls so as to provide significant added strength and rigidity to the pan. The side walls 22 at their upper edges are integrally and monolithically joined to a generally horizontally oriented top flange or hem 24 which extends around the upper outer periphery of the pan. This top hem 24 is defined by a bottom wall which joins through a rounded corner to the upper edge of the respective side wall and then projects horizontally outwardly a small extent. The bottom wall 25 then joins monolithically to a rounded outer edge 26 which is in effect a reverse bend, the latter in turn joining to a horizontal top wall 27 which directly overlies the bottom wall 25. The top wall 27 projects inwardly so as to terminate at an inner edge 28 which is spaced inwardly a small distance beyond the respective side wall 22. The inner edge 28 also has a plurality of return segments or flanges 29 integrally and monolithically joined thereto at longitudinally spaced intervals therealong. The flanges 29 are cantilevered downwardly a limited extent into the interior of the compartment 18, whereby these segments or flanges 29 hence become locked in the concrete which fills the compartment so as to improve the edge loading characteristics of the floor panel by providing a generally horizontal locking between the pan and the concrete adjacent the outer upper edges thereof. The concrete which fills the compartment, when solidified, effectively defines a majority of the upper surface 14 of the floor panel, which upper concrete surface is substantially flush with the upper surface of the top hem 24.

Considering now the bottom wall 21 of the pans, this bottom wall includes a primary center wall part 31 which is spaced inwardly from the pan side walls 22 by a small extent, and is disposed in upwardly spaced relationship from the lower extremity or surface of the pan, with this raised center wall part 31 extending over a high percentage of the overall area of the bottom wall. This raised center wall part 31 includes a generally flat and horizontally large center wall portion 32 which is spaced upwardly from the lower extremity of the pan and extends over a majority of the bottom wall area, and this raised center wall portion 32 is in turn joined to and surrounded by a curved transitional wall portion 33 which at an inner upper edge defines a smooth and integral transition into the main center wall portion 32. This transitional wall portion 33, as it projects outwardly toward the side wall, has a smoothly curved surface which gradually curves and slopes downwardly as it projects outwardly, with the transitional wall portion 33 terminating in an outer edge which integrally joins to a generally flat base wall 34 which defines the bottom extremity of the pan. This base wall 34 surrounds the curved transitional wall portion 33, and the base wall 34 projects outwardly and at its other edge is joined through smoothly rounded corners to the bottoms of the side walls 22. The flat base wall 34, as it projects transversely inwardly from one of the side walls, has a width which is relatively small in comparison to the overall width of the pan, and the transverse width of the base wall 34 is similar in magnitude to the transverse width of the curved transitional wall portion 33.

In the illustrated and preferred embodiment, the raised and flat center wall portion 32 associated with the bottom of the pan is preferably disposed at an elevation which is spaced upwardly from the bottom wall 34 by about 0.3 to about 0.4 times the overall depth of the pan so that the concrete layer which rigidities within the compartment 18 hence has a thickness throughout the center portion thereof which is substantially less than the thickness of the concrete layer which is defined adjacent the side walls 22 and extends around the perimeter of the floor panel.

The bottom wall of the pan 17 also has a plurality of hollow projections 36 formed in and projecting upwardly from the bottom wall to create an effective fixed securement between the concrete and the pan bottom wall. The projections 36 in the illustrated and preferred embodiment are associated solely with the raised flat center wall portion 32, with a plurality of such projections 36 being dispersed in spaced relationship over this wall portion. Each projection 36 is defined by a generally upright annular wall 37 which is integrally and monolithically joined to the wall portion 32 and projects generally vertically upwardly therefrom, and the upper end of this projection is closed by a top wall 38 which is integrally and monolithically joined to the annular wall defining the upright 37. The projection 36 is formed by suitably cold working (i.e. drawing) the metal of the bottom wall so as to create a hollow protrusion which projects upwardly from the wall, with the upper closed end of the protrusion being secondarily deformed downwardly to define the top wall 38, which secondary deforming operation causes creation of an annular top rim 39 which projects radially outwardly in generally surrounding relationship where the upright 37 joins to the top wall 38.

The hollow projections 36 project upwardly a substantial distance from the bottom wall portion 32, and in fact project upwardly to a location disposed approximately midway between the upper edge of the pan and the elevation of the raised wall portion 32. These hollow projections 36, however, due to their being formed and drawn from the material of the wall portion 32, do not create any apertures or openings in the bottom wall. The projections 36 and specifically the presence of the outwardly projecting lip or flange 39 thereon hence effectively creates a mechanical interlock between the concrete and the metal pan during forming of the floor panel. The projection 36 is preferably of relatively large cross section (i.e., diameter) for example having a diameter of about 20 to 25 millimeters in the illustrated embodiment. Because of the size of these projections 36 and the amount of metal material required to form same from the flat metal sheet, these projections 36 will typically be provided only on the large raised center wall portion 32.

The bottom wall of the pan 17 also has a plurality of small microfeatures 41, i.e., hollow protrusions, formed in and projecting upwardly from the bottom wall 31. The microfeatures or protrusions 41 in the illustrated embodiment comprise a small-diameter upright annular wall 42 provided with a top wall 43 at the upper end thereof which effectively closes off the protrusion so that the bottom wall 31 is free of openings or apertures. These protrusions or microfeatures 41, which resemble small silo-shaped protrusions in the illustrated embodiment, are oriented vertically upwardly and are dispersed over the entirety of the pan bottom wall 31. In particular, a large number of microfeatures 41 are formed in and project upwardly from the raised center wall portion 32, with clusters of these microfeatures 41 being positioned between the hollow projections 36. One cluster of protrusions or microfeatures 41 is illustrated in FIG. 10. These microfeatures 41 project upwardly from the respective bottom wall through a vertical extent which is less than the height of the hollow projections 36 and, more significantly, the microfeatures 41 have a cross-section (i.e. diameter) which is significantly smaller than the cross section of the projections 36. In the illustrated embodiment, the microfeatures 41 have a cross-sectional diameter of about four to six millimeters. In addition, the number of protrusions 41 associated with the raised flat wall portion 32 is significantly greater than the number of hollow projections 36, for example the number of protrusions 41 typically being five or more times the number of hollow projections 36. In addition, a significant number of microfeatures 41 are also formed in and project upwardly from both the transitional wall portion 33 and the flat base wall 34.

The provision of the large number and high density of microfeatures 41 as associated with the bottom wall of the pan, and the projection of these microfeatures into the concrete adjacent the bottom side thereof, hence enables the concrete to rigidify around these microfeatures to assist in creating a lock between the concrete and the steel pan, and in addition provides a large number of force transfer or contact points from the concrete to the steel pan to hence maintain the structural integrity of the concrete, particularly when the lower portion thereof is subjected to tension stresses. The presence of these microfeatures 41 on the downwardly curved transitional wall area 33 is particularly significant with respect to creating a lock between the concrete and the pan and an effective transfer of forces from the concrete to the bottom wall of the pan over a large number of contact points.

The bottom wall of the pan and specifically the flat raised center wall portion 32 also has a plurality of additional protrusions 44 projecting upwardly therefrom through a height similar to the height of the microfeatures 41. The protrusions 44 are also dispersed rather uniformly over the wall portion 32 and, in plan view, have a generally X or cross-shaped configuration which is defined by a pair of intersecting but elongate tunnel-like ribs 45 which are deformed upwardly from the wall portion 32. These protrusions 44 and their significant horizontal dimensions in both transverse directions effectively rigidify the bottom wall portion 32 so as to prevent deflection of the type which is typically referred to as oil-canning. These anti-oil canning protrusions 44, like projections 36 and microfeatures 41, are also created by suitable upward deforming of the bottom wall so that the bottom wall of the pan remains free of openings or apertures therethrough.

The side walls 22 of the pan are also free of openings or apertures therethrough so that the bottom of the pan effectively defines a closed and sealed boundary.

Considering now the gusseted corner 23 which is defined at each corner of the pan 17, and referring specifically to FIGS. 4, 9 and 11, this gusseted corner is defined by edge walls 46 and 47 which are defined adjacent the ends of and project transversely inwardly from the respective side walls 22, with these edge walls 46 in turn being joined together by a face wall 48 which is deformed inwardly and extends generally diagonally of the corner relative to the adjacent side walls 22. This face wall 48 projects vertically throughout the height of the pan and defines the corner of the compartment, and about midway throughout the height thereof, the face wall 48 is deformed outwardly so as to define a generally horizontal shoulder or step 49 which faces upwardly from the interior of the compartment. The face wall 48 at its upper edge is deformed outwardly to join with the bottom wall of the top hem. The formation of the gusseted corner 23 causes the pan to have a rather large corner part 51 which is coextensive with the top hem but which, due to the inward depression of the gusseted corner, is disposed over an open region 52 as defined thereunder, which region accommodates therein a part of the pedestal head member, as discussed hereinafter. This top corner 51 also has an opening 53 projecting vertically therethrough for communication with the region 52, which opening 53 is surrounded by a countersunk wall 54 for accommodating the head of a threaded fastener which projects through the opening for engagement with the pedestal head. The opening 53, as illustrated in FIG. 11, is elongated diagonally inwardly of the pan to permit a suitable tool to be inserted through the opening to facilitate gripping of the pan for handling and manipulation thereof.

Considering now the construction of the adjustable upright pedestal 11, and referring specifically to FIGS. 14-22, This pedestal assembly includes a base 56 defined by a horizontally enlarged base member 57 having a hollow upright 58 fixed thereto and projecting upwardly from the center of the base member. The base member 57 in the illustrated embodiment is preferably formed as a horizontally large platelike member, such as by being stamped or formed in one piece from metal so as to have appropriate reinforcing and other desired features associated therewith. This base member 57 is adapted to be supported on the floor or base surface 12 and is typically secured thereto, as by means of an adhesive. The pedestal assembly also includes a rod or stem 59 which has the lower portion thereof closely slidably guided within the upright 58, which stem has a central threaded portion which is threadably engaged with a surrounding nut 61, the latter bearing against the upper edge of the upright 58 for permitting height adjustment in a conventional manner.

The upper end of stem 59 has a reduced diameter portion which is press fit within a central opening 63 formed in a head member 62, which opening 63 is defined by a center support sleeve 64.

The pedestal head member 62 includes a generally horizontally extending top wall 65 which projects outwardly in surrounding relationship to the center opening 63, and this wall 65 has a plurality, here four, of openings 66 projecting vertically therethrough and defined by cylindrical sleeves 67 which are cantilevered downwardly from the top wall. The openings 66 are disposed in uniformly spaced relationship along a circular pattern centered about the center opening 63, and are suitably spaced from this opening 63 so that the individual openings 66 cooperate and align the openings 53 associated with the corners of floor panels 13.

The top wall 65 of the head member is provided with radially projecting gussets 68 which surround and project radially outwardly from the center opening 63 to provide for significant strength and reinforcement of the top pedestal member, particularly the top wall thereof. The pedestal member also has a surrounding skirt or edge wall 69 which projects vertically downwardly generally around the outer periphery of the top wall, and this edge wall at four locations around the head member, namely at locations positioned radially outwardly from the openings 66, are provided with horizontally-oriented bottom shelves 71 which project outwardly through a limited extent.

The top wall 65 of the head member also has a shallow groove or recess formed therein and extending outwardly from each opening 66 through the outer peripheral edge of the head member.

Lastly, the head member has a plurality of stringer-support tabs 73 fixed thereto and projecting outwardly in surrounding relationship thereto. There are four such stringer tabs disposed substantially in equally spaced intervals around the head member, namely at 90° intervals, with each stringer tab 73 being positioned generally midway between each circumferentially adjacent pair of bottom shelves 71. The tab member 73 is disposed adjacent and projects horizontally outwardly from the pedestal head member adjacent the lower edge of the peripheral edge wall, and the tab member has a generally downwardly-opening channel-shaped cross section for purposes of strength and rigidity. This tab hence defines thereon a generally flat top wall 74 which, spaced inwardly a small distance from the free end thereof, is provided with an opening 75 extending vertically therethrough.

The pedestal head member 62 in the illustrated and preferred embodiment is constructed as a one-piece monolithic member, for example being formed by stamping or the like, from one piece of platelike material so that the head member can have the desired shape for structural and functional purposes while at the same time providing desirable strength and rigidity and minimal material.

The raised floor system 10 of this invention also includes horizontally elongate stringers 81 (FIGS. 23-24) which are intended to extend between and couple adjacent pedestals for providing support along the adjacent edges of the supported floor panels 13. The stringer 81 as illustrated by FIGS. 23-24 is defined as a generally inverted open channel having strengthening edge flanges 82 extending the lower edges thereof. This channel-shaped cross section of the stringer defines a generally flat top wall 83 which is adapted to be positioned under and hence disposed for engagement with the top hems 24 of a pair of adjacent floor panels 13.

Each end of the elongate stringer 81 is provided with a top wall or shelf 84 which is generally parallel with but spaced downwardly from the top wall 83, and this lower shelf 84 projects to the free end of the stringer and has a suitable opening 85 formed vertically therethrough. The shelf 85 is intended to rest on top of the tab 73 associated with the pedestal head member, whereby the openings 75 and 85 can be aligned and a suitable pin or fastener, such as a self tapping screw, can then be inserted into these aligned openings for securing the stringer to the pedestal head member. When so secured, the upper surface defined on the top wall 83 of the stringer is substantially at the same elevation as the top wall 65 defined on the pedestal head member so as to be disposed for supportive engagement with the bottom surface 55 defined on the underside of the top hem 24 and as additionally defined on the bottom surfaces of the corner parts 51.

Figure 14:
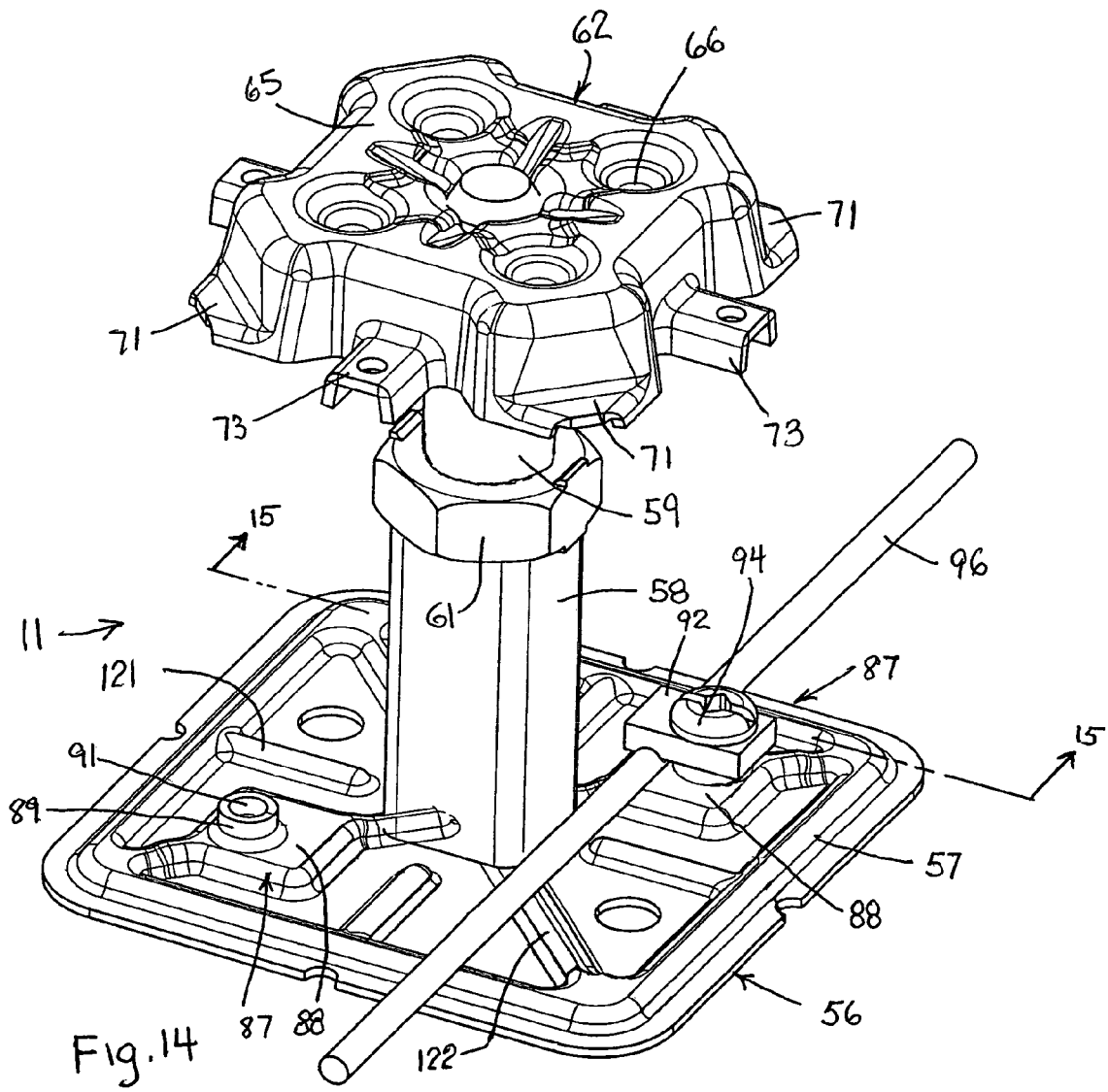
FIG. 14 is a perspective view of the improved height-adjustable pedestal assembly and illustrating the ground wire attachment structure associated therewith.
Figure 15:
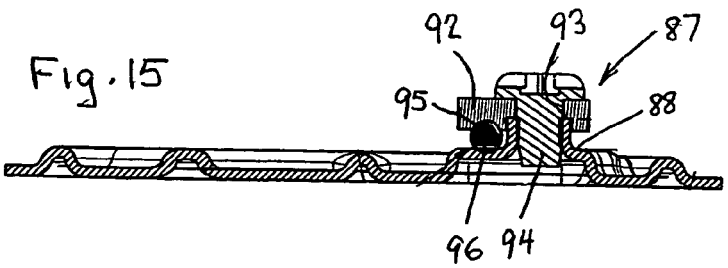
FIG. 15 is a sectional view taken generally along line 15-15 in FIG. 14.
Figure 17:
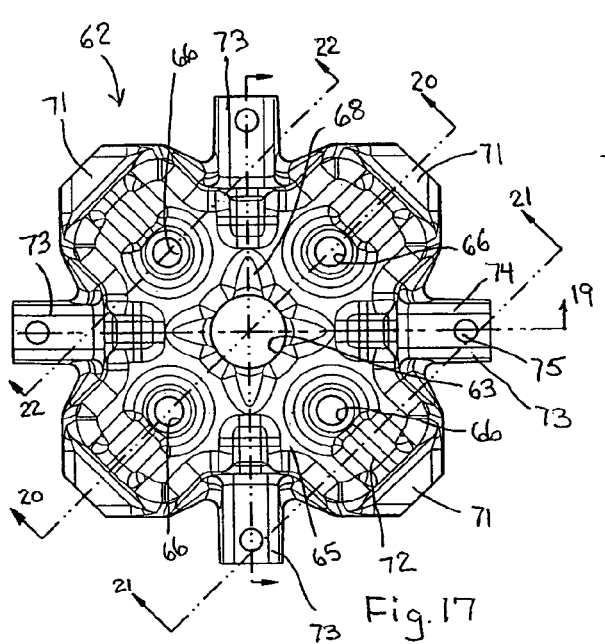
FIG. 17 is a top view of the pedestal head shown in FIG. 16.
Figure 16:
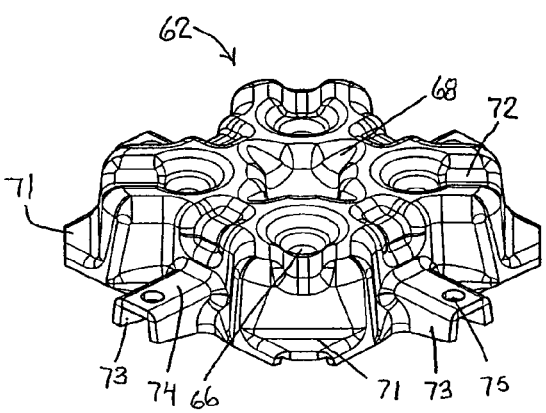
FIG. 16 is a perspective view of solely the pedestal head as associated with the pedestal assembly of FIG. 14.
Figure 18:
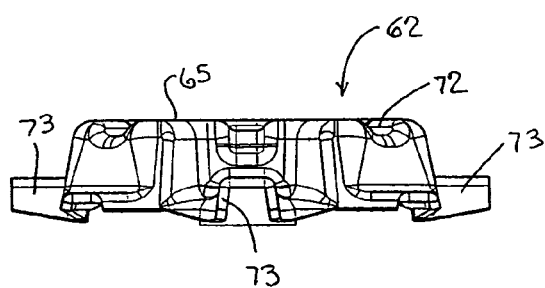
FIG. 18 is a side elevational view of the pedestal head shown in FIG. 17.
Figure 19:
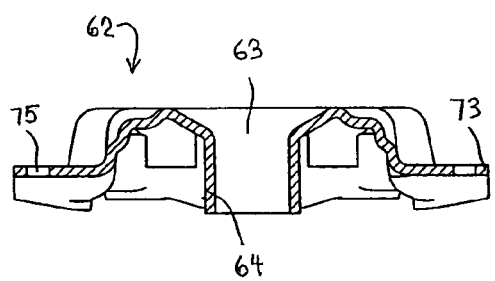
FIGS. 19, 20, 21 and 22 are sectional views taken along lines 19-19, 20-20, 21-21 and 22-22, respectively, in FIG. 17.
Figure 20:
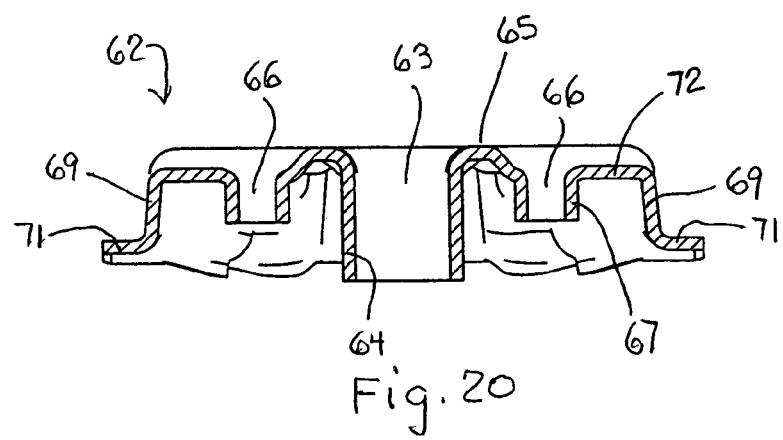
Figures 21, 22:
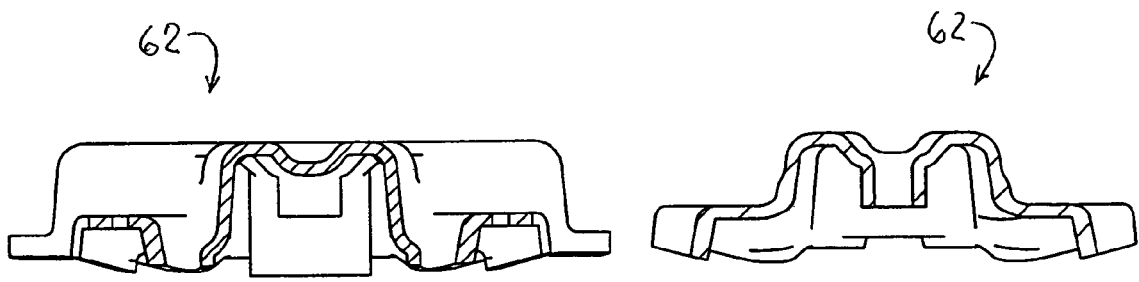
Figure 27:
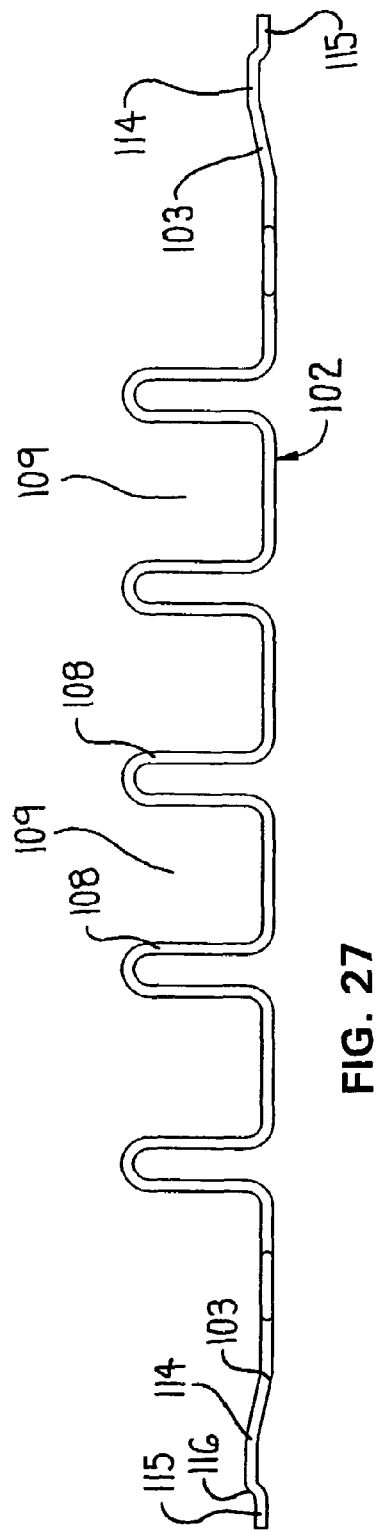
FIG. 27 is a front elevational view of the wire manager shown in FIGS. 25-26.
Figure 28:
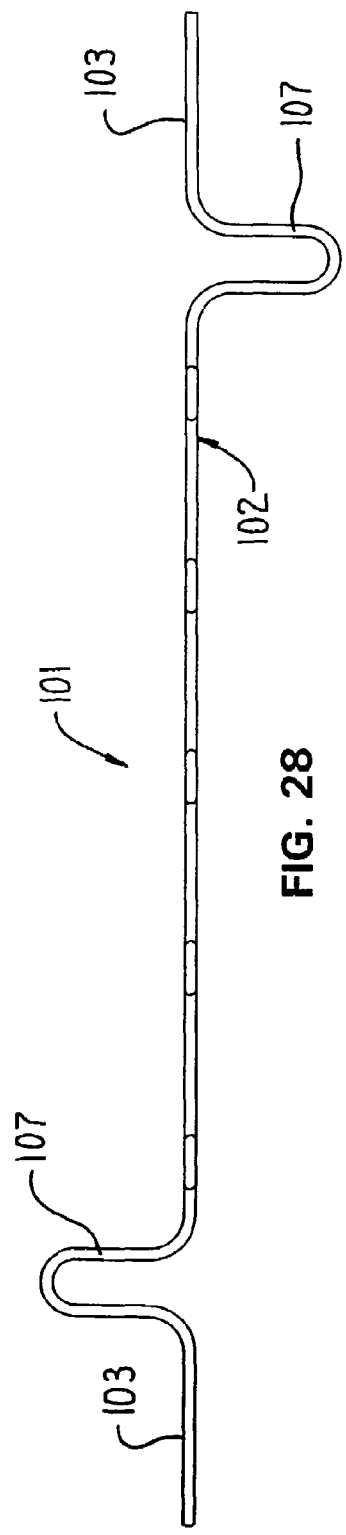
FIG. 28 is a top view of the wire manager shown in FIG. 27.
Figure 29:
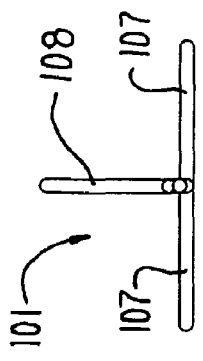
FIG. 29 is an end elevational view of the wire manager shown in FIG. 27.

As illustrated by FIGS. 14-15, the pedestal assembly of the present invention also has a grounding feature associated therewith, and more specifically a pair of such grounding features 87 are disposed on the base member 56 substantially on diametrically opposite sides of the upright 58 so as to be positioned in close proximity to diagonally opposite corners of the base member.

Each grounding feature 87 includes a raised platform 88 which is defined in the base member and defines thereon a generally flat upper surface which is spaced upwardly a small distance above the remainder of the base member. This platform additionally has a post 89, formed generally as a hollow sleeve, fixed to and cantilevered upwardly from the platform through a short vertical extent. An opening 91 projects vertically downwardly through the post 89.

The grounding feature 87 as described above is integrally and monolithically formed on the base member 57 in the illustrated and preferred embodiment, and it cooperates with a removable clamping member or plate 92 which is configured to cooperate with the grounding feature. This clamping plate 92 has a stepped bore or opening 93 extending therethrough, the lower or larger diameter portion of which is adapted to accommodate therein the upper end of the post 89 to permit the clamping member 92 to be seated thereon. A suitable fastener such as a self-tapping threaded screw or like element 94 projects downwardly through the aligned openings 91 and 93 to fixedly secure the clamping plate 92 to the base member. The clamping plate 92 has an undercut groove 95 formed in the lower surface thereof in slightly offset relationship from the post, which groove 95 faces the opposed platform surface 88 so that when the clamping plate is tightened in position, the groove 95 and platform surface 88 cooperate to clampingly hold a conventional ground wire 96 therebetween. An elongated ground wire 96, or interconnected such ground wires, can then be readily secured in series to the adjacent base members so as to effect electrical grounding of the pedestals and of the floor assembly.

Since the base member 56 has a pair of grounding features 87 associated therewith, this permits individual grounding wires to extend in transverse relationship to one another, or alternative the grounding wire can be positioned on which ever side of the upright 58 is most convenient for purposes of installation.

Considering now the cable manager, and referring specifically to the embodiment shown in FIGS. 2 and 25-29, the cable manager comprises an elongate member having a generally horizontally elongate center part 102 which is adapted to extend horizontally between adjacent pedestals 11, and which is provided with cantilevered rodlike end parts 103 which are adapted to permit securement of the wire manager to the adjacent pedestals.

The base member 57 of each pedestal 11 has at least one, and preferably a plurality of mounting features 104 integrally associated therewith. In the illustrated embodiment the mounting feature 104 comprises a rounded or raised tunnel-like part 105 which projects upwardly from the base member so as to define a generally horizontally oriented opening 106 therethrough. This opening 106 is sized to permit the rodlike end part 103 to be slidably but snugly inserted therein.

The base member 57 of the pedestal preferably has four such mounting features 104 provided thereon, one being positioned adjacent each side edge thereof. These mounting features are also positioned generally so as to be disposed within vertical planes which centrally intersect the base member so that the mounting features of adjacent pedestals substantially align with one another to facilitate mounting and engagement with opposite ends of the cable manager 101.

As to the specific construction of the cable manager 101, the horizontally elongate center part 102 thereof is provided with a pair of horizontally projecting arms 107 which are disposed adjacent opposite ends of the center part 102, whereby each horizontal arm 107 is hence disposed in close proximity to but spaced slightly inwardly from the cantilevered rodlike end part 103. The arms 107 as disposed adjacent opposite ends of the wire manager project horizontally in opposite direction so as to provide for stable supportive engagement with the floor or base surface 12.

The elongate center portion 102 of the wire manager also has a plurality of additional arms 108 projecting vertically upwardly therefrom in sidewardly spaced relationship therealong, whereby sidewardly adjacent vertical arms 108 define therebetween upwardly opening guide channels 109 which are provided so as to provide positional orientation and confinement for selected cables, such as the cables 111 and 112 which are only diagrammatically illustrated in FIG. 25.

In the illustrated embodiment the wire manager 101 is formed from an elongate one-piece wire rod of generally round cross-section, and the rod is suitably bent so that both the horizontal arms 107 and the vertical arms 108 are formed generally as U-shaped loops as they project radially outwardly from the center portion. The center portion 102 in this construction is hence defined by a plurality of short rod segments which respectively join the adjacent loop-defining arms together.

To install the wire manager 101 between adjacent pedestal bases 57, the wire manager can be sufficiently resiliently transversely deflected or deformed, such as by being bent into a generally bow-shaped configuration so as to enable the end parts 103 to be inserted into the tunnel-like mounting features 104 associated with adjacent pedestals. When so positioned, the horizontal arms 107 hence substantially engage the floor to support the wire manager and maintain the vertical arms 108 in an upright orientation to hence define the guide channels 109 for confinement of cables therein, whereas the engagement of end parts 103 with the features 104 maintains the wire manager 101 positionally joined to the adjacent pedestals, and the one-piece construction of the wire manager 101 simplifies its construction and its installation particularly since installation does not require any separate parts or fasteners.

To control the disposition of cables in the space below the raised floor, wire managers 101 can be secured between adjacent pedestal bases at whatever locations are desired, such as either in alignment or in transverse relationship as diagrammatically illustrated in FIG. 25, so as to permit the wires to be confined and yet extend lengthwise along or bent transversely around the pedestals to permit the cables to be positioned as desired within the space under the raised floor. At the same time, however, the wire managers can be easily and readily assembled without interfering with or obstructing the space beneath the floor such as often happens when separate cable guide trays are utilized, and at the same time the overall arrangement possesses structural and installational simplicity and reduced cost.

Referring now to FIGS. 30-36, there is illustrated a preferred variation of the pedestal base, as well as a preferred variation of the cable grounding structure associated therewith. The corresponding parts of the modified pedestal base and cable grounding structure are designated by the same reference numerals utilized above except for the addition of a prime (') thereto.

The modified pedestal base 56', as illustrated by FIGS. 30-33, has the generally horizontally enlarged base member 57' thereof formed from a metal platelike horizontal member, for example being stamped or formed in one piece so as to have reinforcing and other functional features associated therewith. This base member 57' has a plurality of raised strengthening or reinforcing ribs 121 deformed upwardly in the center portion thereof. The ribs 121 are oriented in a generally cross-shaped pattern wherein aligned pairs of ribs are disposed on imaginary lines which extend transversely between the side edges of the plate and intersect generally at the center thereof. These ribs 121 not only provide increased strength and rigidity to the base member, but additionally provide points of supportive contact with the lower end of the hollow upright 58', which contact points facilitate welding of the upright 58' to the base member 57'.

Base member 57' also has, in the illustrated arrangement, a further pair of raised ribs 122 formed in and protruding upwardly thereof, which raised ribs 122 are disposed on opposite sides of the center of the base member and are oriented generally along a diagonal line which extends between opposite corners of the base member. These ribs 122, and the fact that each is disposed between a pair of adjacent ribs 121, enables the upper surfaces of the ribs 122 to function as supporting contact points for grounding cables, as discussed hereinafter.

The base member 57' also has the retaining tunnels 105' formed so as to project upwardly therefrom, with one of these tunnels being positioned adjacent the center of each side edge of the base member so that the tunnel defines therein an opening 106' which opens sidewardly toward the respectively adjacent side edge of the base member. Each of the tunnel members 105', and the tunnel opening 106' extending therethrough, is spaced outwardly from the end of, but generally aligned with, an adjacent reinforcing rib 121.

With respect to the cable grounding structure 86', this again includes a grounding feature 87' which is fixedly associated with the base member 57', the latter being provided with a pair of grounding features 87' disposed adjacent diagonally opposite corners thereof. The grounding feature 87' again includes a post or hub part 89' which is deformed upwardly of the base member through a predetermined extent so as to terminate at a generally flat upper end, with this post or hub part 89' having the opening 91' projecting vertically therethrough.

Figure 30:
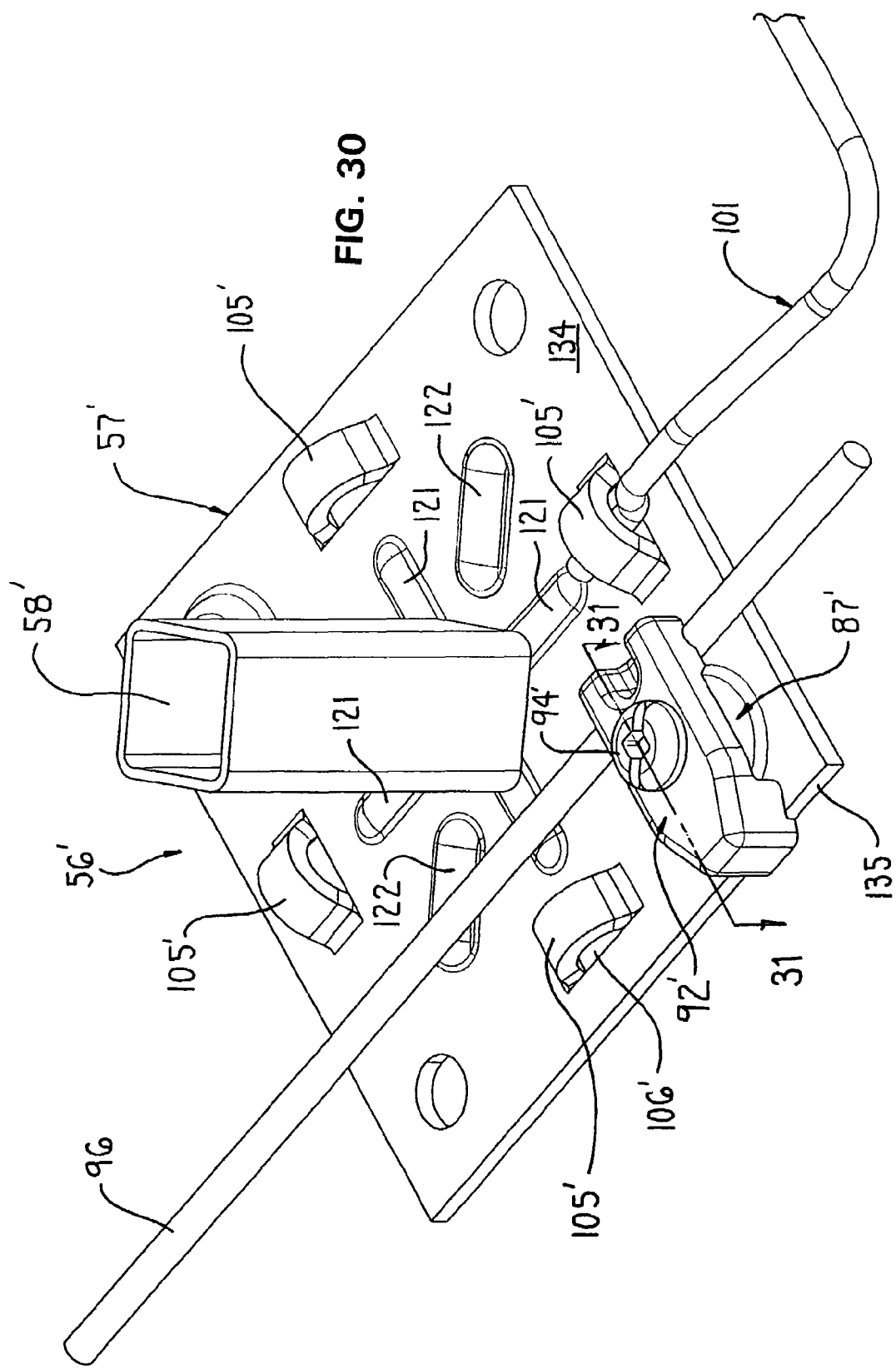
FIG. 30 is a perspective view similar to FIG. 14 and illustrating a modified and preferred base for the pedestal assembly and also illustrating a modified and preferred ground wire attachment structure associated therewith.
Figure 31:
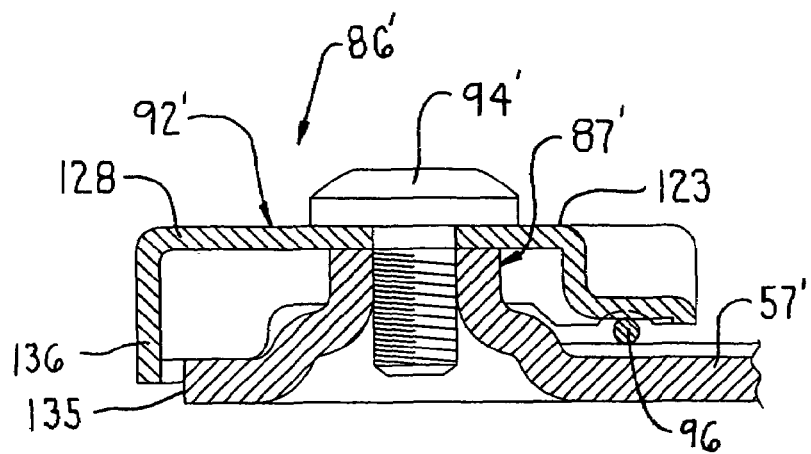
FIG. 31 is an enlarged, fragmentary sectional view taken generally along line 31-31 in FIG. 30.

The grounding feature 89' cooperates with a removable clamping member 92' which, as shown in FIGS. 30-31, is secured to one of the grounding hubs 89' by a fastener 94', such as a self-tapping screw, so as to permit clamping and grounding engagement with a conventional ground wire 96.

The clamping member 92' is horizontally elongated and has an opening 93' formed transversely therethrough generally midway throughout the length thereof, whereby the clamping member hence has an inner end part 123 and an outer end part 128 which are configured for engagement with the grounding cable 96 and the plate member 57', respectively.

More specifically, the inner end part 123 of the clamping member 92' has, in the vicinity of the free end thereof, gripping structure associated with the underside thereof for gripping and clamping engagement with the ground cable 96. This gripping structure includes a bottom wall 124 which is positioned so as to be pressed downwardly in clamping engagement with the upper surface of the ground cable 96. This bottom clamping wall 124 in turn is positioned sidewardly between a pair of confinement notches 125 which are of arcuate configuration and open upwardly from sidewalls 126 associated with the clamping member. The notches 125 and the bottom clamping wall 124 positioned therebetween are substantially aligned so as to permit all of them to cooperate with the elongate ground cable 96. Further, the notches 125 are preferably shaped and sized so that the depth of the notches (i.e., the height thereof) slightly exceeds the elevation of the clamping wall 124 so as to ensure that the latter wall properly engages the upper surface of the ground cable 96, while at the same time the notches 125 effectively sidewardly contain the ground cable to prevent it from displacing sidewardly away from the clamping member.

The other or outer end part 128 of the clamping member 92' defines thereon a generally L-shaped seating or clamping part 129 which projects downwardly for clamping engagement with an edge portion of the base member 57'. This seating part 129 includes a pair of spaced sidewall parts 131 which project downwardly from the top wall 130 of the clamping member, and these sidewall parts 131 are appropriately configured so as to define a downwardly-facing bottom edge wall 132 which at its outer end terminates in a downwardly projecting shoulder 133, thereby defining a tail part 136 which projects downwardly so as to overlap the side edge 135 of the base member 57'. The construction of the seating part 129, as described above, enables the bottom edge wall 132 and the shoulder 133 to respectively abut the upper surface 134 and edge surface 135 of the base plate 57' substantially as illustrated in FIG. 31 when the clamping member 92' is securely fixed and properly seated on the grounding hub 89'.

Figure 32:
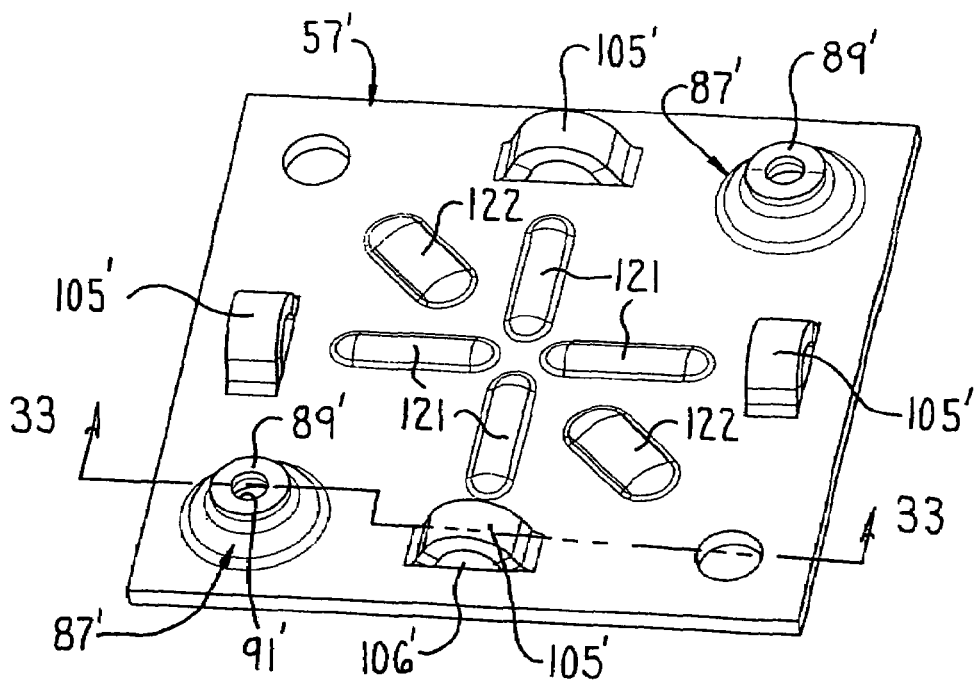
FIG. 32 is a perspective view which illustrates solely the base member or plate associated with the modified base of FIG. 30.

With the cable clamping structure 86' positively engaged and seated with the grounding cable 96 as illustrated in FIGS. 31-32, the cable on the underside thereof is engaged with the tops of the ribs 121 and 122, and simultaneously the cable 96 on the top side thereof is securely clampingly engaged with the bottom clamping surface 124 defined on the clamp member 92. The disposition of the cable 96 within the notches 125 prevents the cable from inadvertently moving sidewardly out of clamping engagement. The secure gripping of the cable 96 to the base plate 57' hence provides the desired grounded electrical connection therebetween. In addition, when in this clamped relationship, the seating part 129 defined on the outer end of the clamping member 92' is effectively seated downwardly both against the upper surface 134 of the base plate, as well as against the edge 135 of the base plate, with these latter contacts occurring at two sidewardly spaced locations as defined by the sidewall parts 131. The contact between the base member and the outer end of the clamping member 92' hence provides desired transverse leverage with respect to downward clamping of the clamp surface 124 against the top of the cable 96, and this seating of the clamping member 92' against the base member 57' also provides significant torsional restraint (i.e., restraint against torsional or twisting movement generally about the axis of the fastener screw 94') so as to prevent inadvertent release of the grounding wire 96 due to imposition of longitudinal forces thereallong.

Figure 37:
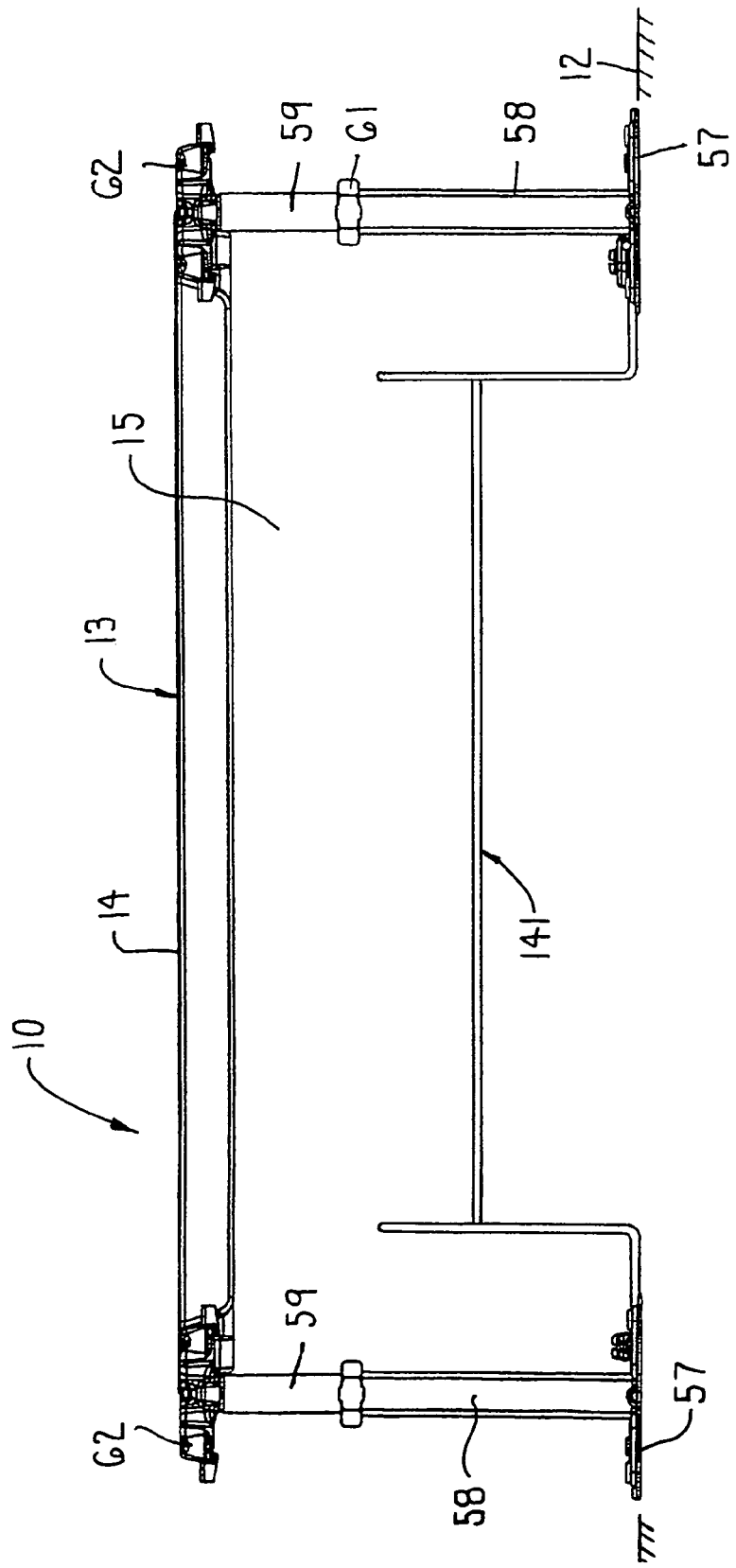
FIG. 37 is a view similar to FIG. 2 but showing a modified wire manager.
Figure 38:
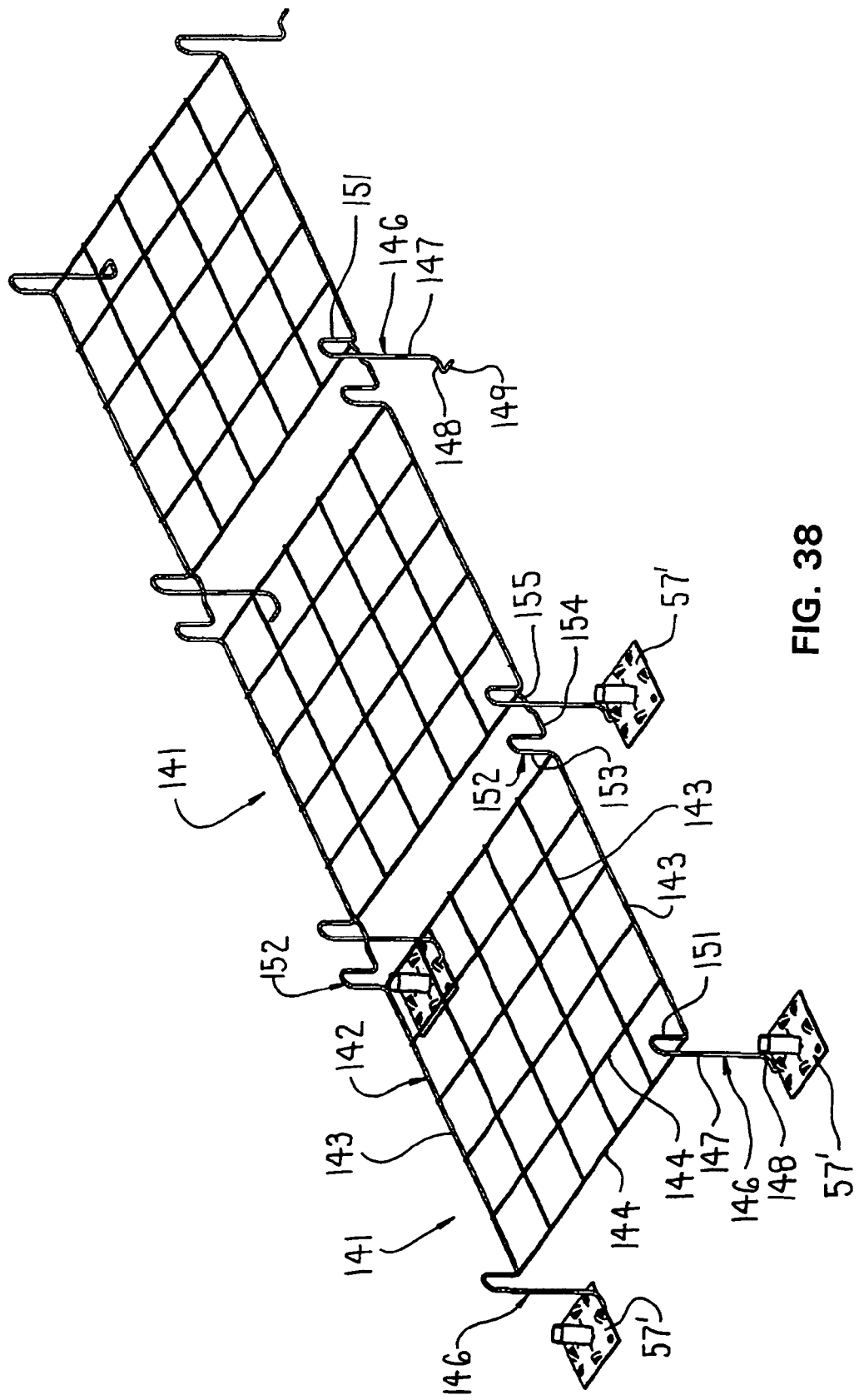
FIG. 38 is a diagrammatic perspective view, taken from above, and illustrating the modified wire manager and its cooperation and connection between the bases of adjacent pedestals.
Figure 39:
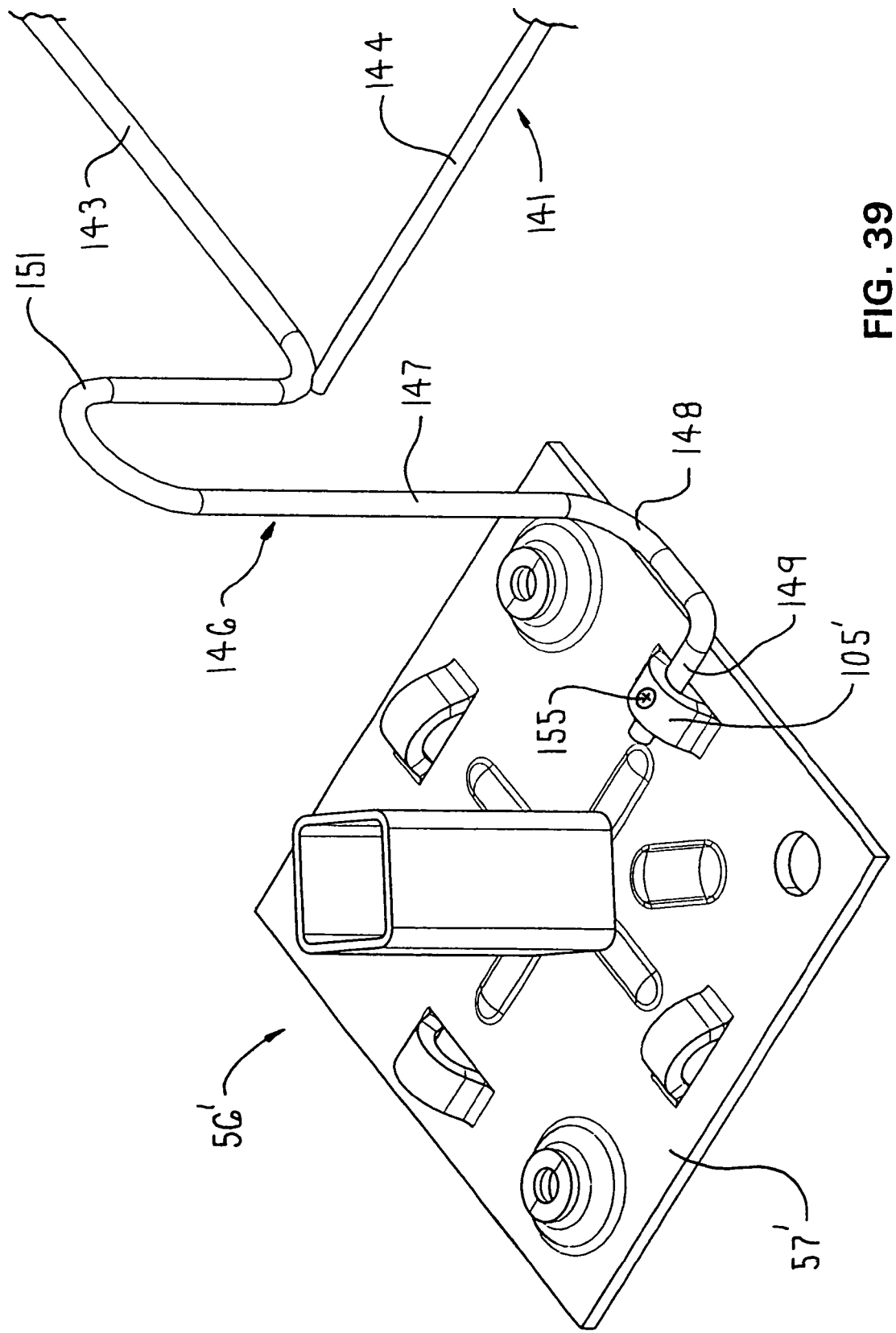
FIG. 39 is a fragmentary enlargement of a part of FIG. 38.

Referring now to FIGS. 37-39, there is illustrated another embodiment of a cable manager 141 which is intended for disposition in the space between the floor 12 and the raised floor panels 13 so as to provide for at least partial positional control over cabling which runs through this space. The cable manager 141 functions generally as a tray or shelf which extends over a significant part of the generally square or rectangular floor area defined between a plurality of pedestal assemblies, typically four such assemblies disposed in a generally square of rectangular arrangement, such as is conventional. The cable management tray 141 is designed to provide a supportive surface for cabling in upwardly spaced relation above the floor 12.

The cable management tray 141 includes a main center tray part 142 which is of significant horizontal extent, both in length and width dimensions thereof, with this tray part 142 being generally rectangular and in the preferred embodiment square when viewed from above. The size of the center tray part 142 is such that it extends both lengthwise and transversely over a majority of the distance which separates two adjacent pedestal assemblies in the respective lengthwise and transverse dimensions of the raised floor arrangement.

In the illustrated and preferred construction, the center tray part 142 is formed generally as an open grid defined by a plurality of generally parallel but sidewardly spaced longitudinally-extending rod elements 143 which are rigidly joined to a plurality of sidewardly-spaced but generally parallel transversely-extending rod elements 144. The elements 143 and 144 extend generally in perpendicular crossing relationship to one another and are suitably fixedly joined at the crossing points, such as by welding, brazing or the like. The elements 143 and 144 are typically defined by elongate wire rods of circular cross section.

The cable management tray 141, at one transverse edge thereof, is provided with connecting parts 146 which are disposed at the corners of the center tray part 142 and project downwardly therefrom for attachment to the base member 57' (or 57) of an adjacent pedestal. The connecting part 146 in the illustrated embodiment includes a cantilevered lower leg part 147 which projects vertically downwardly and, at its lower end, is provided with a short horizontally projecting foot part 148 which is intended for engagement with the floor. This foot part 148, at its other end, has a cantilevered rod part 149 which is bent horizontally inwardly for engagement within one of the tunnels 105' (or 105) associated with the pedestal base member 57'.

The connecting part 146 also includes an upright 151 which is cantilevered upwardly a predetermined distance above the center tray part 142 at the corner thereof. In the illustrated embodiment the connecting part 146 is formed from an elongated wire rod which constitutes an extension of the outermost longitudinal rod member 143. In this regard, this outermost longitudinal rod member 143 has an end part which extends beyond the edgemost transverse rod member 144, and this end part is suitably deformed so as to define both the upright 151 and the lower supporting leg part 147. The upright 151 is defined generally by the wire rod being bent to have an inverted U-shaped configuration which projects upwardly above the center tray part 142. One leg of the inverted U is joined at the corner of the tray part and projects upwardly therefrom, and the other leg of the inverted U is of substantially greater vertical extent so as to project downwardly a significant distance below the tray part 142 so as to terminate at the foot part 148 associated with the lower end thereof.

The connecting parts 146 provided adjacent opposite corners along one side edge of the cable management tray 141 are configured such that the rod parts 149 thereon project transversely in opposite directions so that each connecting part hence can have the foot part 149 thereof transversely slidably inserted into a sidewardly facing tunnel 105' associated with the adjacent pedestal base member 57'. The formation of the connecting parts 146 from the longitudinal rod member 143, and specifically the elongate and downwardly cantilevered leg 147 terminating in the foot part 148, enables sufficient resilient deflection of the connecting part 146 so as to facilitate manual insertion and resilient retention of the rod part 149 in the respective attachment tunnel 105.

The cable management tray 141 also has a further pair of connecting parts 152 associated with the opposite transverse edge of the tray part 142, which connecting parts 151 are positioned generally at or adjacent the remaining corners of the tray part 142. Each of these connecting parts 152 is constructed similar to the connecting part 146 in that it includes an inverted U-shaped upright 153 which is formed integrally from the end of the outermost longitudinal rod element 143 so that one leg of the inverted U projects upwardly from the corner of the tray part, and the other leg is spaced therefrom in the longitudinal direction of the tray part. This other leg of the inverted U, however, at an elevation corresponding generally to the plane of the tray part 142, is then suitably bent through an angle of approximately 90° so as to define a cantilevered end part 154 which projects longitudinally through a limited distance. The cantilevered end part 154, adjacent its free end, has a generally downwardly-opening hook shape 155 so as to permit it to be supportingly engaged with the end edgemost transverse element 144 of a further cable management tray, such as another identical cable management tray 141 or a modified cable management tray 141A as shown in FIG. 39.

The cable management tray 141A is substantially identical to the cable management tray 141 except that the tray 141A has the connecting parts 152' associated with the one edge thereof provided with the outer leg of the upright 153' extended downwardly below the center tray part and provided with a configuration similar to the connecting part 146 so that the modified connecting part 152' can hence function as a support leg for direct supportive engagement with the floor.

The cable management tray 141 or 141A is, as described above, of a one-piece construction, and connects to a pair of adjacent pedestals without requiring any separate parts or fasteners. The tunnel member 105' can be provided with a locking member if desired, such as a set screw 155 (FIG. 39), to provide for positive securement and grounding of the cable manager 101 or 141 if deemed necessary or desirable.

With the cable management trays as described above and as illustrated in FIG. 38, a plurality of such trays can be easily disposed in the space between the raised floor and the subfloor. The trays can be arranged longitudinally and/or transversely in series so that each tray 141 has one end thereof positionally secured and controlled by its engagement with a pair of pedestal bases, which engagement is created by resiliently deflecting the legs 147 a sufficient extent to allow the foot parts 149 to align with and be resiliently inserted into the respective tunnel 105. The other end of each tray 141 is supported on an adjacent tray 141 or 141A. A tray 141A may be utilized as the endmost tray associated with a row of trays 141 since the tray 141A has the supporting structures 152' provided on the one edge thereof disposed for supportive engagement with the floor.

As an alternative, the cable support arrangement disposed in the space beneath the raised floor can be defined by a plurality of trays 141A, which trays can be positioned in adjacent relationship to one another and independently supported by having one edge thereof engaged with a pair of pedestal bases, and the other edge thereof supportingly engaged on the floor.

The large rectangular center grid 142 associated with the cable manager 141, 141A enables a significant number of cables (data or power) to be supportingly engaged thereon and run beneath the raised floor, while at the same time the cables are maintained in upwardly spaced relation from the subfloor. In addition, the uprights 151, 153 adjacent each corner of the tray sidewardly confine the cables on the trays so as to prevent the cables from being accidentally displaced sidewardly so as to fall downwardly onto the floor. Further, when rows of cable management trays join together in generally right-angled relationship to one another, the uprights associated with the corners of the trays, where they join, effectively assist in confining the cables on the trays while the cables are bent around the corner.

It will be appreciated that the cable management trays 141, 141A as illustrated in FIG. 37 can also assume other shapes and configurations. For example, the trays can be formed with side walls projecting upwardly along the longitudinally extending edges thereof if necessary or desirable so as to provide more positive sideward confinement of the cables within the tray. The trays can also be provided, for example along opposed transverse edges thereof, with a channel-defining configuration similar to that defined by the cable manager 102 illustrated in FIGS. 27-29. The horizontal grid defining the tray can also be formed by a sheetlike member in place of the intersecting wire rods.

In operation and use, after the pedestals have been properly positioned in the desired gridlike pattern and the pedestal head members are appropriately joined in longitudinal and transverse relationship by means of the stringers, then the individual floor panels 13 are positioned such that the top hems are disposed on the stringers, and the large corner parts of the top hems are positioned in engagement with the top wall 65 of the pedestal head member. The corners of four adjacent floor panels are disposed in engagement with a single pedestal head member, and an appropriate fastener or screw is then inserted through the opening in the floor panel corner for threaded engagement within the respective opening 66 defined in the pedestal head member to effect securement therebetween. At the same time, a significant portion of the load of the floor panel is transmitted directly to the pedestal head member, independent of the corner part 51, due to the step 49 as associated with the gusseted corner being supportively engaged over the shelf 71 formed on the pedestal head member, thereby providing a more desirable transmission of load forces through the floor panel to the pedestal head member, whereby the total load forces are hence not imposed on the corner part 51.

The wire managers 101 and/or 141, 141A will typically be installed prior to positioning of the floor panels 13 on the pedestal heads. Alternately, however, selective floor panels can be subsequently removed so as to permit installation of the wire managers in the desired locations.

Some of the structural, constructional and functional features associated with the raised floor system and specifically the improved floor panel and pedestal arrangement of the present invention are summarized below.

Panel Design

1. Mushrooms and their under cut feature. The "mushrooms" and their shape are dispersed throughout the raised section of the panel. These "mushrooms" with their undercut geometry, significantly attach the steel panel to the concrete. The mushrooms also reduce the volume of concrete required to fill the panel, therefor reducing cost/weight of the panel. The circular shape of the mushrooms also reduces stress concentrations on the feature.

2. Completely closed and sealed underside of pan. The panel has been designed in such a manner that the entire "air side" or bottom side of the panel is completely sealed. The pan is formed through a progressive stamping process, which does not pierce the skin. Since there are no breaks in the skin of the panel, it is not necessary to "seal" or "plug" the pan during the pouring of the concrete. Another added benefit of having a sealed "air side" of the panel is that there is a significantly reduced possibility of air contamination when the system is used in HVAC applications.

3. Method employed to attach the concrete to the steel pan without the use of bonding agents. The concrete and the steel are joined together through the use of strategically formed and placed features and micro-features. The concrete in the panel cures around these features (which have been formed in size to allow the aggregate of the concrete the set in and around the features). Once cured the concrete forms a solid volume around the features, which locks the concrete to the steel. This design aspect eliminates the need for bonding agents or cleaning (degreasing) the pan's surface prior to filling the panel with concrete.

4. Micro-feature dispersion and strength as it relates to cut panels. During the installation of the system, it is necessary to cut panels to fit the geometry of the room. When a panel is cut, the structural integrity of the panel can be compromised. The panel includes mushrooms and micro-features in such a manner that no matter how the panel is cut, there still is sufficient features to join the concrete to the steel portion of the panel, thus realizing the full strength benefit of the composite panel.

5. Dispersion pattern and shape of micro-features. The size and shape of the "micro-features", and their dispersion, allows for a positive mechanical connection of the concrete to the steel under pan. The numerous micro-features are dispersed in such an apparently "random" manner as to reduced direct line of sight crack propagation.

6. Panel perimeter beam and recessed center portion. The panel design is such that it maximizes strength and reduces weight of the panel. The panel features an outer deep beam, with a raised center section. With simple beam theory, the further one is able to place material from the neutral axis, the more resistant that section will be when subjected to bending about that neutral axis. The outer perimeter of the panel features such a beam that is full height of the panel. This perimeter beam acts like a support "stringer", supporting the panel on all four sides. The center portion of the panel, which is supported by the perimeter beam, has been made much shallower to reduce the volume of the panel, and therefore the overall weight and cost of the panel.

7. Upper return hem radius. The top portion of the panel is hemmed back on itself, which allows for the panel to have a soft radius on the edge of the panel. The soft radius allows for easy handling and a smooth lead in of the panel during installation.

8. Double wall as a result of the upper hem and the strength benefits. The return hem on the top portion of the panel has a double wall giving a strong upper "frame".

9. Return portion of the upper frame hem and its connection to the concrete. The upper hemmed frame of the panel features segmented returns. These returned sections become buried in the concrete when the panel is filled. Once the concrete cures, the returned features are locked in the concrete and greatly improve the edge loading characteristics of the panel by joining the concrete and steel together.

10. Upper frame segmented return features. The segmentation of the return features on the upper frame allow for easy manufacturing of the panel and reduce the possibility of crack propagation in the panel by disrupting the propagation lines with the return bends.

11. Returned frame hem. The upper frame, due to its production sequence, insures a flat steel pan will be produced, which aids in filling the panel with concrete.

12. Cross features to prevent "oil-canning" of the steel pans. The panel design features cross-shaped features that will significantly reduce the steel pans' tendency to oil can when handling the pan for concrete casting. These features will make the panels virtually flat which greatly improves the ability to pour a repeatable flat panel. These features will also engage the concrete and aid with the connection of concrete to steel for the composite panel.

13. Gusseted ½ height corner connection. The corner detail of the panel is designed to incorporate the use of strong support gussets, formed into the steel pan that will be backed with concrete. These corner gussets help support the corners of the panels when connected to their support pedestal heads. The corner connection detail is "stepped" to allow for the use of a shorter pedestal head. The availability to use a relatively short pedestal head significantly reduces the cost of the pedestal head.

14. Corner connection method. The connection of the panel to the support pedestal has been designed to incorporate "self aligning" features. The countersunk obrounds on the panel engage mating countersunk holes on the support pedestal. The shelf on the corner of the panel, in combination with its support gussets, lead in and direct the bottom panel support tab of the support pedestal to its final resting place. These features allow the panel to rest on its supports with or without the use of mounting screws to secure the panel.

15. Geometry of the corner obround holes. The mounting holes located on the panel are obround in shape to allow for clearance for panel lifting.

16. Gradual transition area from outer beam to inner plate region. The transition from the strong outer beam section to the relatively weaker internal plate region is important to insure sufficient connection of steel to concrete in this area as well. This panel design employs a soft, gradual radius with micro-features dispersed throughout the transition area, insuring a strong connection between steel and concrete in this critical area.

17. Panel edge taper and minimized edge. The edges (i.e. side walls) of the panel are tapered to ease installation of the panels, allowing for the panels to be more easily installed by allowing for rotational clearance when placing a panel. The edges of the panel have been minimized to reduce shipping and handling damage.

18. Double wall corner for extra strength. The corners are designed with a double wall construction. This double wall maximizes the strength of the corner.

19. Corner connection detail has no "compressible" elements. There are no compressible elements in the corner connection. The panel has a double wall corner, which rests directly on the pedestal support and does not require the use of support shims or sleeves. This allows the corners to be secured tightly with the use of a screw, which greatly reduces the potential for noise creation.

20. 0.25 mm per panel or 0.5 mm gap between panels. This fit is very tight. This helps with overall integrity of the system and aids with the sealing of plenums used in HVAC applications.

Pedestal Head

21. Stem gussets for added strength. These gussets are design in such a manner that local stresses are distributed throughout the top web of the pedestal head. These gussets eliminate the requirements for an additional brace component.

22. The lower panel shelf allows for the entire load of the panel to be distributed on both the top and bottom portions of the pedestal head. This allows for a more even distribution of the loads on the pedestal head. This shelf also aids in the registration of the panel with respect to the pedestal during installation.

23. Stringer tab. The design of the stringer tab is such that a load bearing stringer can be quickly and easily placed in the tab, which aligns the stringer automatically into position. The stringer tab employs the use of structural ribs and webs to help support the loads imparted by the stringer.

24. Deep drawn center sleeve on the pedestal head allows for a press fit of the main threaded support stem. Due to the deep drawn center of the pedestal head, there is no need to weld the threaded stem to the pedestal head.

25. Extruded holes for panel connection. The four extruded holes are size for 20 thread rolling screws, eliminating the requirement to have the holes tapped to accept screws to secure panels. The extruded holes have also been designed to accept and secure an additional support brace to the pedestal head if required for heavy loading conditions.

26. Singular part construction. The main portion of the pedestal head is made of one formed part, and not a welded assembly.

Pedestal Base

27. Internal and integral grounding for each pedestal base. The design of the pedestal base allows for a simple device for the purpose of electrical grounding to be attached to the base.

28. Integral cable management. The pedestal base is designed such that it has features that allow the connection of integral wire management accessories such as the wire management strip and wire trays.

29. Sound dampening plug. A molded plastic "plug", when inserted into the base tube, dampens sound by not allowing steel on steel contact to occur. In areas where specific codes do not permit this plug to be used, it may be easily removed.

Miscellaneous

30. Total panel thickness of 27 mm. The use of the outer beam and the dispersion of features to connect concrete and steel enables a minimum panel depth.

31. The curing process/rate and pouring process. The concrete is a fast-cure concrete formulated to cure at a rate that has been tuned to the panel pouring process. The panels will cure as quickly as possible, but not too quick as to inhibit the flow of concrete.

32. Galvanized material use. The use of Galvanized material eliminates the requirement for secondary protective coating.

33. Panel lifting device. A panel-lifting device aids with lifting panels. Since it is an open face panel and concrete is a porous material, a typical suction-type lifting device cannot be used to lift the panels. The panel lifter consists of small hook-like pins mounted on a flexible plastic shaft-like handle. The hook-pins engage the panel through the mounting obrounds (which provide clearance between the panel and the support pedestal head). Once the pins are engaged and the handle is lifted vertically, the pins are pulled towards to center of the handle and upwards, which locks the pins into the corners of the mounting obrounds. Once the force is removed from the handle, the pin and handle assembly relaxes and the pins become disengaged, and release the panel.

34. Accessory Panel. The system will have an accessory panel that has a cutout section that allows for the placement of accessory items such as power grommets, air diffusers, power boxes etc. . . . This panel will have a similar construction to the base panel, but will have a reinforced cutout section. This cutout section can be framed with a device that will then accept the accessory item.

35. Overall panel weight of 30#. Through the use of specialized concrete blend and steel pan design, a light weight panel is achieved, such as a panel weight of 30#.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A raised floor system for disposition above a subfloor, comprising:
   a plurality of pedestals positioned on the subfloor in spaced relationship and projecting upwardly therefrom;
   a raised floor supported on said pedestals adjacent upper ends thereof, whereby the raised floor is positioned vertically upwardly from the subfloor to define a clearance space therebetween;
   an electrical grounding arrangement associated with a plurality of said pedestals, the electrical grounding arrangement transferring electric charge between a set of the plurality of said pedestals in response to accumulation of electric charge on said raised floor relative to said subfloor;
   the electrical grounding arrangement as associated with each said pedestal of said plurality of said pedestals including a first clamping part which is permanently and fixedly mounted on the respective pedestal and a second clamping part which is disposed in cooperative relationship with said first clamping part to permit clamping engagement of a grounding cable therebetween, said second clamping part being movably mounted on said pedestal by an adjustable fastener for permitting the second clamping part to be stationarily positionally fixed relative to the pedestal when a grounding cable is clamped between the first and second clamping parts;
   each said clamping part comprising:
      a horizontally large platelike base adapted to be supportingly engaged on the subfloor;
      an upright pedestal column fixedly positioned centrally on said base and cantilevered upwardly therefrom, the pedestal column having structure associated with an upper end thereof for engagement with said floor;
      said electrical grounding arrangement being associated with the base part for permitting grounding engagement with the grounding cable;
      said grounding arrangement including said first clamping part fixed to said base and protruding upwardly thereof, said first clamping part defining thereon an upwardly-facing first grounding surface adapted for grounding engagement with the grounding cable; and
      said grounding arrangement including said second clamping part which is mounted on the base for at least limited relative movement and which defines thereon a downwardly-facing second grounding surface adapted for engaging the grounding cable, whereby the grounding cable is fixedly gripped on generally opposite sides thereof by the first and second clamping parts;
      said base having a pair of horizontally elongate ribs protruding upwardly therefrom in sidewardly spaced relation and defining thereon a sidewardly spaced pair of upper surfaces which define said first grounding surface, and said second grounding surface being disposed sidewardly between the sidewardly spaced pair of upper surfaces, said grounding cable extending between and being engaged with said spaced pair of upper surfaces and being engaged with said second grounding surface at a location between said pair.

2. A system according to claim 1, wherein the pedestal includes said pedestal column which at a lower end is joined to said base which is a horizontally enlarged base plate adapted for supportive disposition on the subfloor, said first clamping part being permanently and fixedly defined on said base plate and defining an upwardly oriented first contact surface adapted for clamping engagement with one side of a grounding cable, said second clamping part being carried on the base plate by said fastener, said second clamping part defining thereon said second contact surface which is disposed upwardly from the first contact surface so that the grounding cable can be stationarily clampingly engaged between said first and second contact surfaces.

3. A system according to claim 2, wherein the base plate has a hub part which is fixedly associated therewith and projects upwardly therefrom, said second clamping part being disposed to overlie said hub part and being coupled thereto by said fastener.

4. A system according to claim 2, wherein said second clamping part has an end part which projects outwardly and abuttingly engages an edge surface of the base plate for resisting horizontal twisting of the second clamping part.

5. A system according to claim 1, wherein the first clamping part is an integral part of said base, and wherein said second clamping part is removably but fixedly secured to said base by said fastener which permits the second clamping part to be positionally fixed relative to the base so as to clampingly engage the grounding cable between the first and second clamping parts.

6. A system according to claim 5, wherein the first and second grounding surfaces are horizontally displaced from one another to grippingly engage the grounding cable at spaced locations lengthwise therealong.

7. A system according to claim 5, wherein the second clamping part is a horizontally elongate clamping member having said fastener extending through a central part thereof for engagement with the base, the horizontally elongate clamping member having first and second end portions disposed on opposite sides of said central part, said second end portion having said second grounding surface defined thereon, and said first end portion having a configuration which seatingly engages an adjacent edge of the base to provide restraint against horizontal twisting of the elongate clamping member.

8. A system according to claim 7, wherein the second end portion of said elongate clamping member has a wall part which defines thereon a generally flat bottom surface which defines said second grounding surface, said second end portion of said elongate clamping member also having a pair of sidewardly spaced downwardly-projecting edge walls disposed on opposite sides of said second grounding surface and protruding downwardly therefrom, said edge walls having recesses opening upwardly from lower edges thereof and sized to at least partially accommodate the grounding cable therein to prevent sideward displacement of the grounding cable.

9. A system according to claim 1, wherein the base is defined by a flat metal plate deformed to define an upwardly protruding portion which defines said first clamping part, said plate having an opening therethrough in sidewardly spaced relationship from said protruding portion for permitting mounting of said second clamping part thereon.

10. A system according to claim 9, wherein said base has a pair of said openings formed therethrough adjacent diagonally opposite corners thereof for permitting a said second clamping part to be mounted on said base at either or both of said openings, said base also having a pair of said protruding portions deformed therein, said pair of protruding portions being positioned substantially diametrically opposite one another and individually positioned generally between the pair of openings so that either said protruding portions is capable of cooperating with a said second clamping part as associated with either of said openings.

11. A system according to claim 1, wherein said floor is comprised of a plurality of contiguous floor panels supported on said pedestals.

12. A system according to claim 11, wherein said floor panels have respective edge portions supported on said upper ends of said pedestals.

13. A pedestal assembly defining a raised floor comprising:
a plurality of floor panels each having top and bottom walls and a side wall extending vertically between said top and bottom walls, said side walls being bent between said top and bottom walls to define a plurality of steps located at corresponding corners of said floor panels, each of said corners respectively including a floor panel opening disposed outwardly of an adjacent one of said steps for receiving a fastener projecting downwardly therethrough; and
a height-adjustable pedestal which, at its upper end, has a pedestal head positioned for supportive engagement of corners of four said floor panels to maintain the floor panels in a raised position, the pedestal head having a top wall which at a center thereof joins to an upper end of an upright pedestal stem, the top wall having four support portions spaced around the center thereof and each having a pedestal opening therethrough which opens from said top wall and aligns with a corresponding one of said floor panel openings in said respective corner of said floor panel overlying said support portion for accommodating said fastener which projects downwardly from said corner of a respective said floor panel, the pedestal head also having, adjacent an outer periphery thereof, four shelves formed in spaced relationship therearound adjacent the outer periphery, said shelves being spaced downwardly from the top wall and projecting outwardly beyond said support portions so as to project under and supportingly engage said steps located at said corresponding corners of the floor panels such that said corners overlie said support portions with said pedestal openings and said floor panel openings being aligned.

14. In a raised floor system having a plurality of pedestals supported on a building floor in sidewardly spaced relationship and projecting upwardly therefrom, and a plurality of floor panels supported on the pedestals adjacent upper ends thereof, whereby the floor panels define a raised floor which is disposed upwardly from the building floor so as to define a space therebetween, the improvement comprising:
said pedestal comprising a horizontally large base plate which is adapted to bear on said building floor, and an upright pedestal column which at a lower end is fixed to said base plate adjacent a center region thereof, said pedestal column adjacent an upper end having a head member which supports respective edge sections of the floor panels, said head members of said pedestals being in sidewardly spaced relation wherein said floor panels sidewardly extend between said head members;
a cable management system positioned in the space between the raised floor and the building floor for controlling the running of electrical cables within said space, said cable management system including a plurality of separate cable management members positioned in horizontally adjacent relationship within said space to define a horizontally elongate cable run between adjacent rows of said pedestals;
a first connecting structure cooperating between said pedestal and one of said cable management members whereby charge accumulated on said one of said cable management members relative to said building floor is dissipated out said pedestal in response to accumulation of such charge, said first connecting structure including a first part which is fixed to the pedestal in downwardly spaced relation from said head member and which defines a cavity therein, a second part which is fixed to said one of said cable management members and is cantilevered outwardly therefrom for fixed positioning within the cavity defined by said first part, said first part having means associated therewith which effects a fixed engagement with the protruding second part on said one of said cable management members below said head member to fixedly connect and electrically ground said one of said cable management members to the pedestal by said first connecting structure engaged therebetween;
said pedestal further including a second connecting structure provided on the pedestal in downwardly spaced relation from said head member and cooperating with an elongate electrically-conductive grounding cable which extends through said space, said second connecting structure including a first grounding part fixed to said pedestal below said head member and defining an exposed grounding surface thereon, and a second grounding part movably mounted on said pedestal and secured thereto by a fastener, said second grounding part defining a second grounding surface thereon which is spaced from and faces oppositely from said first grounding surface so that the elongate grounding cable can be disposed for clamping engagement between the first and second grounding surfaces responsive to said fastener effecting movement of the second clamping part into clamping engagement with the grounding cable.

15. A system according to claim 14, wherein the first part of said first connecting structure is defined as a rigid and monolithic part of the pedestal base plate, and wherein the first part of the second connecting structure is a rigid and monolithic part of the pedestal base plate.

16. A system according to claim 14, wherein the first part is provided on said base plate and has an adjusting screw associated therewith for effecting clamping engagement with the protruding part of the cable manager member.

17. A system according to claim 14, wherein said cable management members and said grounding cable are connected respectively to said pedestals by said first and second connecting structure in downwardly spaced relation from said floor panels and proximate said building floor.

18. A system according to claim 17, wherein said cable management members and said grounding cable are respectively connected to said base plates of said pedestals by said first and second connecting structures.

19. A system according to claim 14, wherein each of said cable management members includes respective opposite ends wherein the opposite ends of each said cable management member includes respective said second parts with said cable management member being connected between a spaced apart pair of said pedestals.

20. In a raised floor system having a plurality of pedestals supported on a building floor in sidewardly spaced relationship and projecting upwardly therefrom, and a plurality of floor panels supported on the pedestals adjacent upper ends thereof, whereby the floor panels define a raised floor which is disposed upwardly from the building floor so as to define a space therebetween, the improvement comprising:

said pedestal comprising a horizontally large base plate which is adapted to bear on said building floor, and an upright pedestal column which at a lower end is fixed to said base plate adjacent a center region thereof, said pedestal column adjacent an upper end having structure for supporting the floor panels;

a cable management system positioned in the space between the raised floor and the building floor for controlling the running of electrical cables within said space, said cable management system including a plurality of separate cable management members positioned in horizontally adjacent relationship within said space to define a horizontally elongate cable run between adjacent rows of said pedestals;

a first connecting structure cooperating between said pedestal and one of said cable management members for effecting fixing and electrical grounding of said one of said cable management members to the pedestal, said first connecting structure including a first part which is fixed to the pedestal and defines a cavity therein, a second part which is fixed to the cable manager member and is cantilevered outwardly therefrom for fixed positioning within the cavity defined by said first part, said first part having means associated therewith for effecting a fixed engagement with the protruding second part on said one of said cable management members to fixedly connect and electrically ground said one of said cable management members to the pedestal;

a second connecting structure provided on the pedestal and cooperating with an elongate electrically-conductive grounding cable which extends through said space, said second connecting structure including a first grounding part fixed to said pedestal and defining an exposed grounding surface thereon, and a second grounding part movably mounted on said pedestal and secured thereto by a fastener, said second grounding part defining a second grounding surface thereon which is spaced from and faces oppositely from said first grounding surface so that the elongate grounding cable can be disposed for clamping engagement between the first and second grounding surfaces responsive to said fastener effecting movement of the second clamping part into clamping engagement with the grounding cable;

wherein the first part of said first connecting structure is defined as a rigid and monolithic part of the pedestal base plate, and wherein the first part of the second connecting structure is a rigid and monolithic part of the pedestal base plate.

21. A system according to claim 20, wherein said floor is comprised of a plurality of contiguous floor panels supported on said pedestals.

22. A system according to claim 21, wherein said floor panels have respective edge portions supported on said upper ends of said pedestals.

23. In a raised floor system having a plurality of pedestals supported on a building floor in sidewardly spaced relationship and projecting upwardly therefrom, and a plurality of floor panels supported on the pedestals adjacent upper ends thereof, whereby the floor panels define a raised floor which is disposed upwardly from the building floor so as to define a space therebetween, the improvement comprising:

said pedestal comprising a horizontally large base plate which is adapted to bear on said building floor, and an upright pedestal column which at a lower end is fixed to said base plate adjacent a center region thereof, said pedestal column adjacent an upper end having structure for supporting the floor panels;

a cable management system positioned in the space between the raised floor and the building floor for controlling the running of electrical cables within said space, said cable management system including a plurality of separate cable management members positioned in horizontally adjacent relationship within said space to define a horizontally elongate cable run between adjacent rows of said pedestals;

a first connecting structure cooperating between said pedestal and one of said cable management members for effecting fixing and electrical grounding of said one of said cable management members to the pedestal, said first connecting structure including a first part which is fixed to the pedestal and defines a cavity therein, a second part which is fixed to the cable manager member and is cantilevered outwardly therefrom for fixed positioning within the cavity defined by said first part, said first part having means associated therewith for effecting a fixed engagement with the protruding second part on said one of said cable management members to fixedly connect and electrically ground said one of said cable management members to the pedestal;

a second connecting structure provided on the pedestal and cooperating with an elongate electrically-conductive grounding cable which extends through said space, said second connecting structure including a first grounding part fixed to said pedestal and defining an exposed grounding surface thereon, and a second grounding part movably mounted on said pedestal and secured thereto by a fastener, said second grounding part defining a second grounding surface thereon which is spaced from and faces oppositely from said first grounding surface so that the elongate grounding cable can be disposed for clamping engagement between the first and second grounding surfaces responsive to said fastener effecting movement of the second;

wherein the first part as provided on said base plate has an adjusting screw associated therewith for effecting clamping engagement with the protruding part of said one of said cable management members.

24. A raised floor system for disposition above a subfloor, comprising:

a plurality of support pedestals positioned on the subfloor in spaced relationship and projecting upwardly therefrom;

a raised floor supported on said pedestals adjacent upper ends thereof, whereby the raised floor is positioned vertically upwardly from the subfloor to define a clearance space therebetween;

an electrical grounding arrangement associated with at least a plurality of said pedestals for permitting them to be coupled together in electrically grounded relationship;

the electrical grounding arrangement as associated with each of said plurality of pedestals including a first clamping part which is permanently and fixedly mounted on the respective pedestal and a second clamping part which is disposed in cooperative relationship with said first clamping part to permit clamping engagement of a grounding cable therebetween, said second clamping part being movably mounted on said pedestal by an adjustable fastener for permitting the second clamping part to be stationarily positionally fixed relative to the pedestal when a grounding cable is clamped between the first and second clamping parts;

wherein each said pedestal comprises:

a horizontally large platelike base adapted to be supportingly engaged on the subfloor;

an upright pedestal column fixedly positioned centrally on said base part and cantilevered upwardly therefrom, the pedestal column having structure associated with an upper end thereof for engagement with said floor;

said electrical grounding arrangement being associated with the base part for permitting grounding engagement with the grounding cable;

said grounding arrangement including said first clamping part fixed to said base and protruding upwardly thereof, said first clamping part defining thereon an upwardly-facing first grounding surface adapted for grounding engagement with the grounding cable; and said grounding arrangement including said second clamping part which is mounted on the base for at least limited relative movement and which defines thereon a downwardly-facing second grounding surface adapted for engaging the grounding cable, whereby the grounding cable is fixedly gripped on generally opposite sides thereof by the first and second clamping parts;

wherein the first clamping part is an integral part of said base, and wherein said second clamping part is removably but fixedly secured to said base by said fastener which permits the second clamping part to be positionally fixed relative to the base so as to clampingly engage the grounding cable between the first and second clamping parts; and wherein the first and second grounding surfaces are horizontally displaced from one another to grippingly engage the grounding cable at spaced locations lengthwise therealong.

25. A raised floor system for disposition above a subfloor, comprising:

a plurality of support pedestals positioned on the subfloor in spaced relationship and projecting upwardly therefrom;

a raised floor supported on said pedestals adjacent upper ends thereof, whereby the raised floor is positioned vertically upwardly from the subfloor to define a clearance space therebetween;

an electrical grounding arrangement associated with at least a plurality of said pedestals for permitting them to be coupled together in electrically grounded relationship;

the electrical grounding arrangement as associated with each of said plurality of pedestals including a first clamping part which is permanently and fixedly mounted on the respective pedestal and a second clamping part which is disposed in cooperative relationship with said first clamping part to permit clamping engagement of a grounding cable therebetween, said second clamping part being movably mounted on said pedestal by an adjustable fastener for permitting the second clamping part to be stationarily positionally fixed relative to the pedestal when a grounding cable is clamped between the first and second clamping parts;

wherein each said pedestal comprises:

a horizontally large platelike base adapted to be supportingly engaged on the subfloor;

an upright pedestal column fixedly positioned centrally on said base part and cantilevered upwardly therefrom, the pedestal column having structure associated with an upper end thereof for engagement with said floor;

said electrical grounding arrangement being associated with the base part for permitting grounding engagement with the grounding cable;

said grounding arrangement including said first clamping part fixed to said base and protruding upwardly thereof, said first clamping part defining thereon an upwardly-facing first grounding surface adapted for grounding engagement with the grounding cable; and said grounding arrangement including said second clamping part which is mounted on the base for at least limited relative movement and which defines thereon a downwardly-facing second grounding surface adapted for engaging the grounding cable, whereby the grounding cable is fixedly gripped on generally opposite sides thereof by the first and second clamping parts;

wherein the first clamping part is an integral part of said base, and wherein said second clamping part is removably but fixedly secured to said base by said fastener which permits the second clamping part to be positionally fixed relative to the base so as to clampingly engage the grounding cable between the first and second clamping parts; and wherein the second clamping part is a horizontally elongate clamping member having said fastener extending through a central part thereof for engagement with the base, the horizontally elongate clamping member having first and second end portions disposed on opposite sides of said central part, said second end portion having said second grounding surface defined thereon, and said first end portion having a configuration which seatingly engages an adjacent edge of the base to provide restraint against horizontal twisting of the elongate clamping member.

26. A system according to claim 25, wherein the second end portion of said elongate clamping member has a wall part which defines thereon a generally flat bottom surface which defines said second grounding surface, said second end portion of said elongate clamping member also having a pair of sidewardly spaced downwardly-projecting edge walls disposed on opposite sides of said second grounding surface and protruding downwardly therefrom, said edge walls having recesses opening upwardly from lower edges thereof and sized to at least partially accommodate the grounding cable therein to prevent sideward displacement of the grounding cable.

* * * * *